US011356690B2

(12) United States Patent
Kato et al.

(10) Patent No.: US 11,356,690 B2
(45) Date of Patent: Jun. 7, 2022

(54) IMAGE PROCESSING APPARATUS AND METHOD

(71) Applicant: SONY CORPORATION, Tokyo (JP)

(72) Inventors: Tsuyoshi Kato, Tokyo (JP); Satoru Kuma, Tokyo (JP); Ohji Nakagami, Tokyo (JP); Koji Yano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,370

(22) PCT Filed: Jul. 5, 2019

(86) PCT No.: PCT/JP2019/026791
§ 371 (c)(1),
(2) Date: Jan. 12, 2021

(87) PCT Pub. No.: WO2020/017359
PCT Pub. Date: Jan. 23, 2020

(65) Prior Publication Data
US 2021/0168394 A1    Jun. 3, 2021

(30) Foreign Application Priority Data
Jul. 20, 2018   (JP) ............................. JP2018-136928

(51) Int. Cl.
*H04N 19/46*   (2014.01)
*H04N 19/597*   (2014.01)

(52) U.S. Cl.
CPC ........... *H04N 19/46* (2014.11); *H04N 19/597* (2014.11)

(58) Field of Classification Search
None
See application file for complete search history.

(56) References Cited

U.S. PATENT DOCUMENTS 9,948,902 B1 *  4/2018  Trundle ................ H04N 7/183
10,580,149 B1 *  3/2020  Lakshminarayanan ......................
                                                       H04N 5/23203
(Continued)

FOREIGN PATENT DOCUMENTS

EP        3501005 A1    6/2019
WO    2018/034253 A1    2/2018
(Continued)

OTHER PUBLICATIONS

International Search Report and Written Opinion of PCT Application No. PCT/JP2019/026791, dated Oct. 8, 2019, 09 pages of ISRWO.
Golla, et al., "Real-time Point Cloud Compression", IEEE, International Conference on Intelligent Robots and Systems (IROS), Sep. 28-Oct. 2, 2015, pp. 5087-5092.
(Continued)

*Primary Examiner* — Francis Geroleo
(74) *Attorney, Agent, or Firm* — Chip Law Group

(57) ABSTRACT

The present disclosure relates to an image processing apparatus and a method that allow for easier and more appropriate rendering. Coded data is generated by encoding a two-dimensional plane image in which position information and attribute information for a point cloud that represents an object having a three-dimensional shape as a group of points are projected onto a two-dimensional plane, and a bitstream that includes the generated coded data and metadata to be used to render the point cloud is generated. The present disclosure can be applied to, for example, an image processing apparatus, an electronic device, an image processing method, a program, or the like.

17 Claims, 22 Drawing Sheets

(56) References Cited

U.S. PATENT DOCUMENTS

| | | | |
|---|---|---|---|
| 2006/0087987 A1* | 4/2006 | Witt | H04N 7/15 |
| | | | 370/260 |
| 2009/0295907 A1* | 12/2009 | Kim | H04N 13/189 |
| | | | 348/43 |
| 2010/0309987 A1* | 12/2010 | Concion | H04N 19/124 |
| | | | 375/240.26 |
| 2017/0351922 A1* | 12/2017 | Campbell | H04N 21/4335 |
| 2018/0053324 A1 | 2/2018 | Cohen et al. | |
| 2018/0278573 A1* | 9/2018 | Lu | H04L 67/12 |
| 2018/0338132 A1* | 11/2018 | Rao Padebettu | G06T 7/70 |
| 2019/0087978 A1 | 3/2019 | Tourapis et al. | |
| 2019/0087979 A1 | 3/2019 | Mammou et al. | |
| 2019/0156518 A1 | 5/2019 | Mammou et al. | |
| 2019/0156519 A1 | 5/2019 | Mammou et al. | |
| 2019/0156520 A1 | 5/2019 | Mammou et al. | |
| 2019/0371051 A1* | 12/2019 | Dore | G06T 7/90 |
| 2020/0013168 A1* | 1/2020 | Seshita | G06T 17/00 |
| 2020/0267374 A1* | 8/2020 | Kitago | H04N 13/243 |
| 2021/0243472 A1* | 8/2021 | Jung | H04N 19/172 |

FOREIGN PATENT DOCUMENTS

| | | |
|---|---|---|
| WO | 2019/055963 A1 | 3/2019 |
| WO | 2019/142666 A1 | 7/2019 |

OTHER PUBLICATIONS

Jang, et al., Video-Based Point-Cloud-Compression Standard in MPEG: From Evidence Collection to Committee Draft [Standards in a Nutshell], IEEE, Signal Processing Magazine, vol. 36, May 2019, pp. 118-123.

Mekuria, et al., "Design, Implementation, and Evaluation of a Point Cloud Codec for Tele-Immersive Video", IEEE, Transactions on Circuits and Systems for Video Technology, vol. 27, No. 4, Apr. 2017, pp. 828-842.

Mammou, et al., "Video-based and hierarchical approaches point cloud compression", ISO/IEC JTC1/SC29/WG11, m41649, Macau, China, Oct. 2017.

Khaled Mammou, "PCC test model category 2 v0", ISO/IEC JTC1/SC29/WG11, MPEG, N17248, Macau, China, Oct. 2017.

* cited by examiner

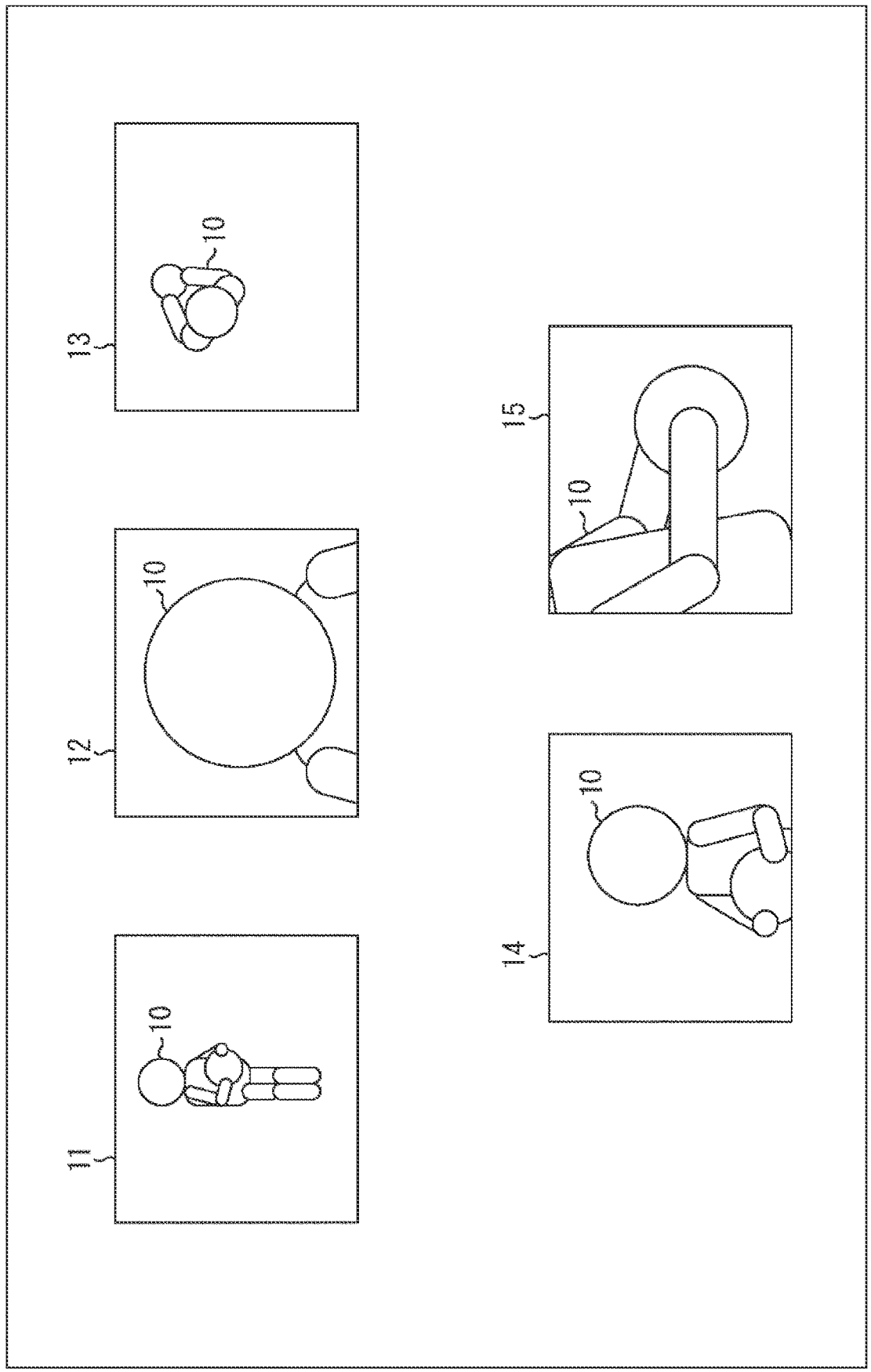

FIG. 2

| NAME | DESCRIPTION | EFFECTS |
|---|---|---|
| Camera Parameter Index | INDEX INDICATING DEFINED CAMERA PARAMETER | SEQUENCE CREATOR CAN PERFORM QUALITY EVALUATION UNDER SAME CONDITIONS REGARDLESS OF SEQUENCE. SEQUENCE USER CAN GRASP CAMERA POSITION WHERE QUALITY IS GUARANTEED. |
| Camera Parameter Category Index | INDEX INDICATING PURPOSE OF CAMERA POSITION | SEQUENCE USER CAN CHECK MEANING OF Camera Position BEFORE USE. |
| frame to world scale | CONVERSION RATE TO Real scale | EACH PARAMETER CAN BE SET IN REAL-WORLD UNIT. |
| bounding box | REGION SURROUNDING 3D OBJECT | MOVING RANGE OF 3D OBJECT IS RETAINED AS Bounding Box ALL THROUGH ENTIRE SEQUENCE OR SECTION SO THAT PARAMETER CAN BE SET IN CONSIDERATION OF MOVEMENTS AND DEFORMATIONS OF 3D OBJECT. |
| Camera Parameter | CAMERA POSITION COORDINATE, GAZE POINT COORDINATE, VECTOR INDICATING UPWARD DIRECTION OF CAMERA, AND FOV | CAMERA PARAMETER CAN BE DEFINED. |
| Camera Path | MOVEMENT TRAJECTORY OF CAMERA | RECOMMENDED CAMERA WORK IS RETAINED AS PARAMETER. |
| Object Path | MOVEMENT TRAJECTORY OF OBJECT | ROUGH MOVEMENT OF 3D OBJECT CAN BE ACQUIRED, AND CAN BE USED AS TIP FOR DETERMINING CAMERA WORK |

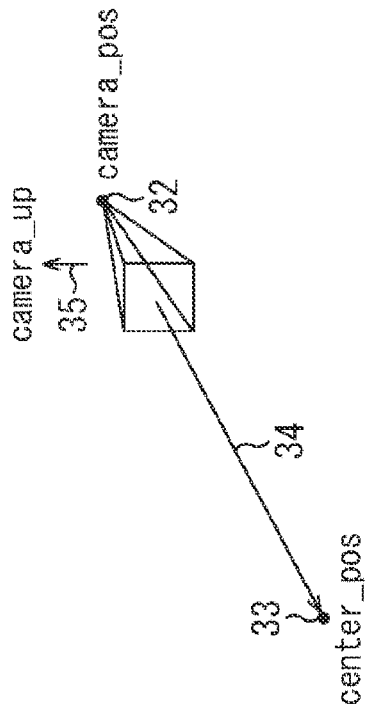

```
// CAMERA POSITION COORDINATE
    float camera_pos_x;
    float camera_pos_y;
    float camera_pos_z;

// CAMERA GAZE POINT COORDINATE
    float center_pos_x;
    float center_pos_y;
    float center_pos_z;

// VECTOR INDICATING UPWARD DIRECTION OF CAMERA
    float camera_up_x;
    float camera_up_y;
    float camera_up_z;

// PROJECTION METHOD
    bool PerspectiveProjection   // PERSPECTIVE PROJECTION IS true
    if(PerspectiveProjection) {
        float fov;   // ANGLE OF VIEW OF LENS
    }
```

| INDEX | DESCRIPTION |
|---|---|
| 0 | <Social Zone><br>DISTANCE BETWEEN 3D OBJECT AND CAMERA IS 2m.<br>CAMERA IS 1.4m FROM GROUND.<br>LINE-OF-SIGHT DIRECTION IS 10 DEGREES DOWNWARD. |
| 1 | <Friendship Zone><br>DISTANCE BETWEEN 3D OBJECT AND CAMERA IS 1m.<br>CAMERA IS 1.4m FROM GROUND.<br>LINE-OF-SIGHT DIRECTION IS 10 DEGREES DOWNWARD. |
| 2 | <Intimate Zone><br>DISTANCE BETWEEN 3D OBJECT AND CAMERA IS 0.5m.<br>CAMERA IS 1.4m FROM GROUND.<br>LINE-OF-SIGHT DIRECTION IS HORIZONTAL. |

FIG. 8
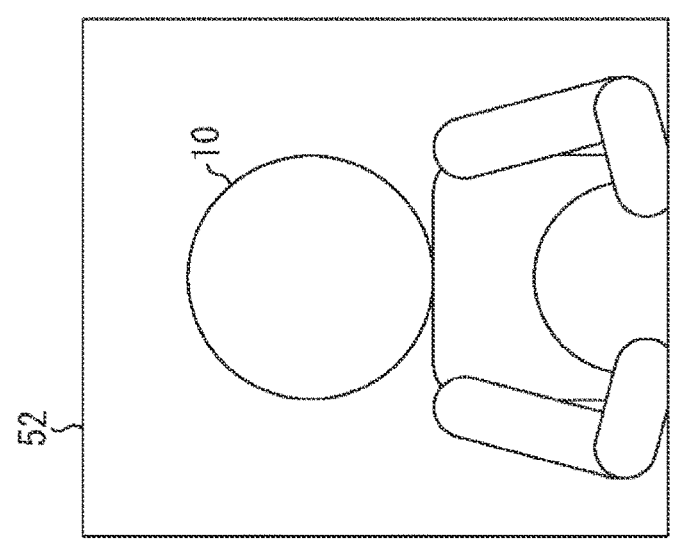
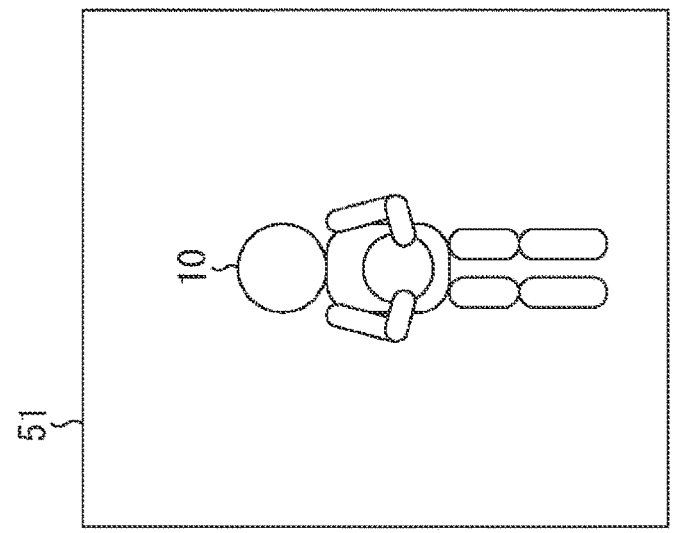

FIG. 9

| INDEX | DESCRIPTION |
|---|---|
| 0 | USED FOR QUALITY CHECK AT TIME OF ENCODING |
| 1 | RECOMMENDED ANGLE (FOR 1st Frame) |
| 2 | RECOMMENDED CAMERA PATH |

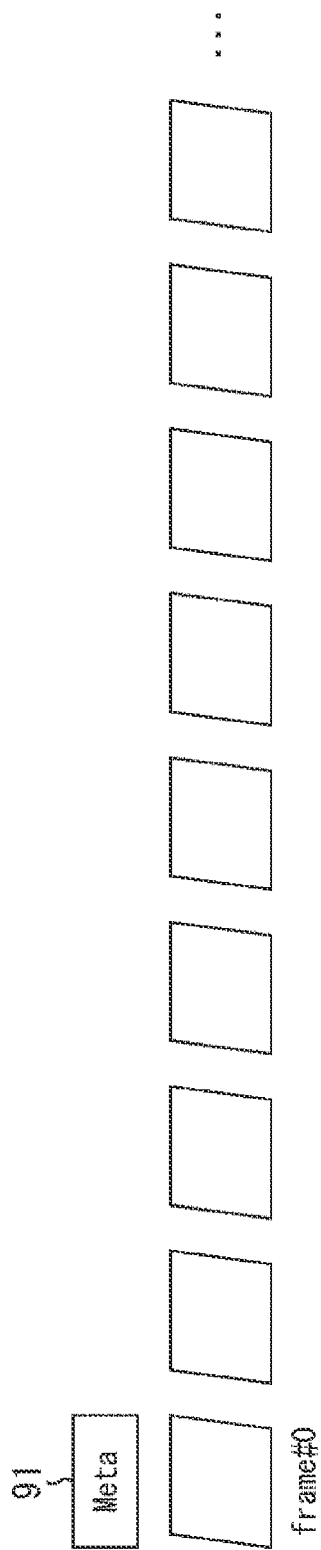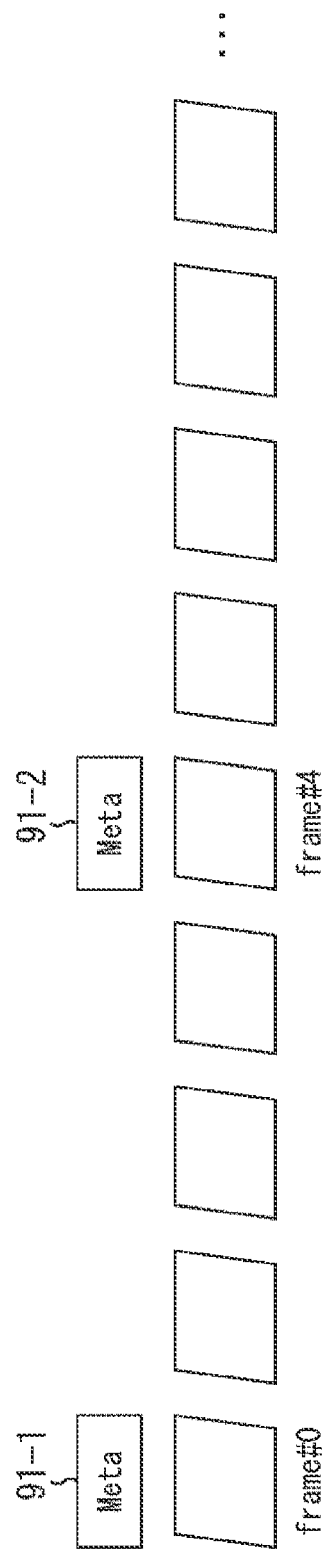

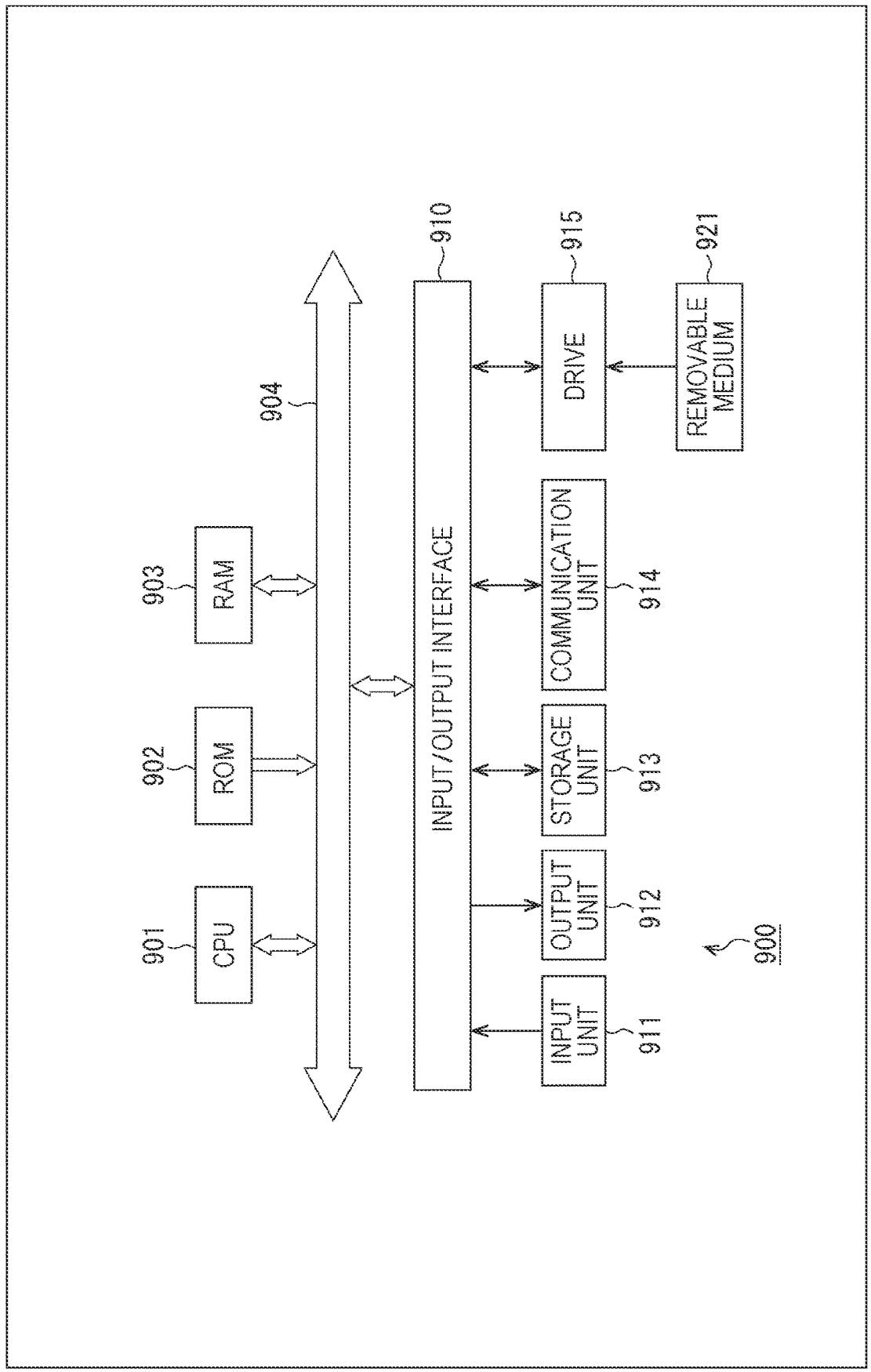

IMAGE PROCESSING APPARATUS AND METHOD

CROSS REFERENCE TO RELATED APPLICATIONS

This application is a U.S. National Phase of International Patent Application No. PCT/JP2019/026791 filed on Jul. 5, 2019, which claims priority benefit of Japanese Patent Application No. JP 2018-136928 filed in the Japan Patent Office on Jul. 20, 2018. Each of the above-referenced applications is hereby incorporated herein by reference in its entirety.

TECHNICAL FIELD

The present disclosure relates to an image processing apparatus and a method, and more particularly to an image processing apparatus and a method that allow for easier and more appropriate rendering.

BACKGROUND ART

As an encoding method for 3D data representing a three-dimensional structure such as a point cloud, there has conventionally been encoding using voxels such as Octree (see, for example, Non-Patent Document 1).

In recent years, as another encoding method, for example, an approach in which each of position information and color information of a point cloud is projected onto a two-dimensional plane for each subregion and encoded by an encoding method for two-dimensional images (hereinafter also referred to as a video-based approach) has been proposed (see, for example, Non-Patent Document 2 to Non-Patent Document 4).

The 3D data encoded as described above is transmitted as a bitstream and decoded. Then, the three-dimensional structure is rendered as if it has been imaged by a camera at an optional position and orientation, and is converted into a two-dimensional image, and the two-dimensional image is displayed or stored.

CITATION LIST

Non-Patent Document

Non-Patent Document 1: R. Mekuria, Student Member IEEE, K. Blom, P. Cesar., Member, IEEE, "Design, Implementation and Evaluation of a Point Cloud Codec for Tele-Immersive Video", tcsvt_paper_submitted_february.pdf Non-Patent Document 2: Tim Golla and Reinhard Klein, "Real-time Point Cloud Compression", IEEE, 2015

Non-Patent Document 3: K. Mammou, "Video-based and Hierarchical Approaches Point Cloud Compression", MPEG m41649, October 2017

Non-Patent Document 4: K. Mammou, "PCC Test Model Category 2 v0", N17248 MPEG output document, October 2017

SUMMARY OF THE INVENTION

Problems to be Solved by the Invention

However, in the case of this method, it has not been possible to grasp an appropriate value to be set as a camera parameter at the time of rendering decoded 3D data, and it has been difficult to perform appropriate rendering.

The present disclosure has been made in view of such circumstances, and is intended to allow for easier and more appropriate rendering.

Solutions to Problems

An image processing apparatus according to one aspect of the present technology includes a coding unit that generates coded data by encoding a two-dimensional plane image in which position information and attribute information for a point cloud that represents an object having a three-dimensional shape as a group of points are projected onto a two-dimensional plane, and a generation unit that generates a bitstream that includes the coded data generated by the coding unit and metadata to be used to render the point cloud.

An image processing method according to the one aspect of the present technology includes generating coded data by encoding a two-dimensional plane image in which position information and attribute information for a point cloud that represents an object having a three-dimensional shape as a group of points are projected onto a two-dimensional plane, and generating a bitstream that includes the generated coded data and metadata to be used to render the point cloud.

An image processing apparatus according to another aspect of the present technology includes a decoding unit that decodes a bitstream that includes coded data obtained by encoding a two-dimensional plane image in which position information and attribute information for a point cloud that represents an object having a three-dimensional shape as a group of points are projected onto a two-dimensional plane and metadata to be used to render the point cloud, reconstructs the point cloud, and extracts the metadata, and a rendering unit that renders the point cloud reconstructed by the decoding unit by using the metadata extracted by the decoding unit.

An image processing method according to the other aspect of the present technology includes decoding a bitstream that includes coded data obtained by encoding a two-dimensional plane image in which position information and attribute information for a point cloud that represents an object having a three-dimensional shape as a group of points are projected onto a two-dimensional plane and metadata to be used to render the point cloud, reconstructing the point cloud, and extracting the metadata, and rendering the reconstructed point cloud by using the extracted metadata.

In the image processing apparatus and method according to the one aspect of the present technology, coded data is generated by encoding a two-dimensional plane image in which position information and attribute information for a point cloud that represents an object having a three-dimensional shape as a group of points are projected onto a two-dimensional plane, and a bitstream that includes the generated coded data and metadata to be used to render the point cloud is generated.

In the image processing apparatus and method according to the other aspect of the present technology, a bitstream that includes coded data obtained by encoding a two-dimensional plane image in which position information and attribute information for a point cloud that represents an object having a three-dimensional shape as a group of points are projected onto a two-dimensional plane and metadata to be used to render the point cloud is decoded, the point cloud is reconstructed, and the metadata is extracted, and then the extracted metadata is used to render the reconstructed point cloud.

Effects of the Invention

According to the present disclosure, images can be processed. In particular, rendering can be performed more easily and more appropriately.

BRIEF DESCRIPTION OF DRAWINGS

FIG. 1 illustrates an example of rendering 3D data.
FIG. 2 illustrates an example of metadata to which the present technology is applied.
FIGS. 3A and 3B illustrate an example of a camera parameter.
FIG. 4 illustrates an example of a camera parameter index.
FIG. 8 illustrates an example of rendering.
FIG. 9 illustrates an example of a camera parameter category index.
FIGS. 12A and 12B illustrate an example of a metadata update timing.
FIG. 22 is a block diagram illustrating an example of a main configuration of a computer.

MODE FOR CARRYING OUT THE INVENTION

Figure 5:
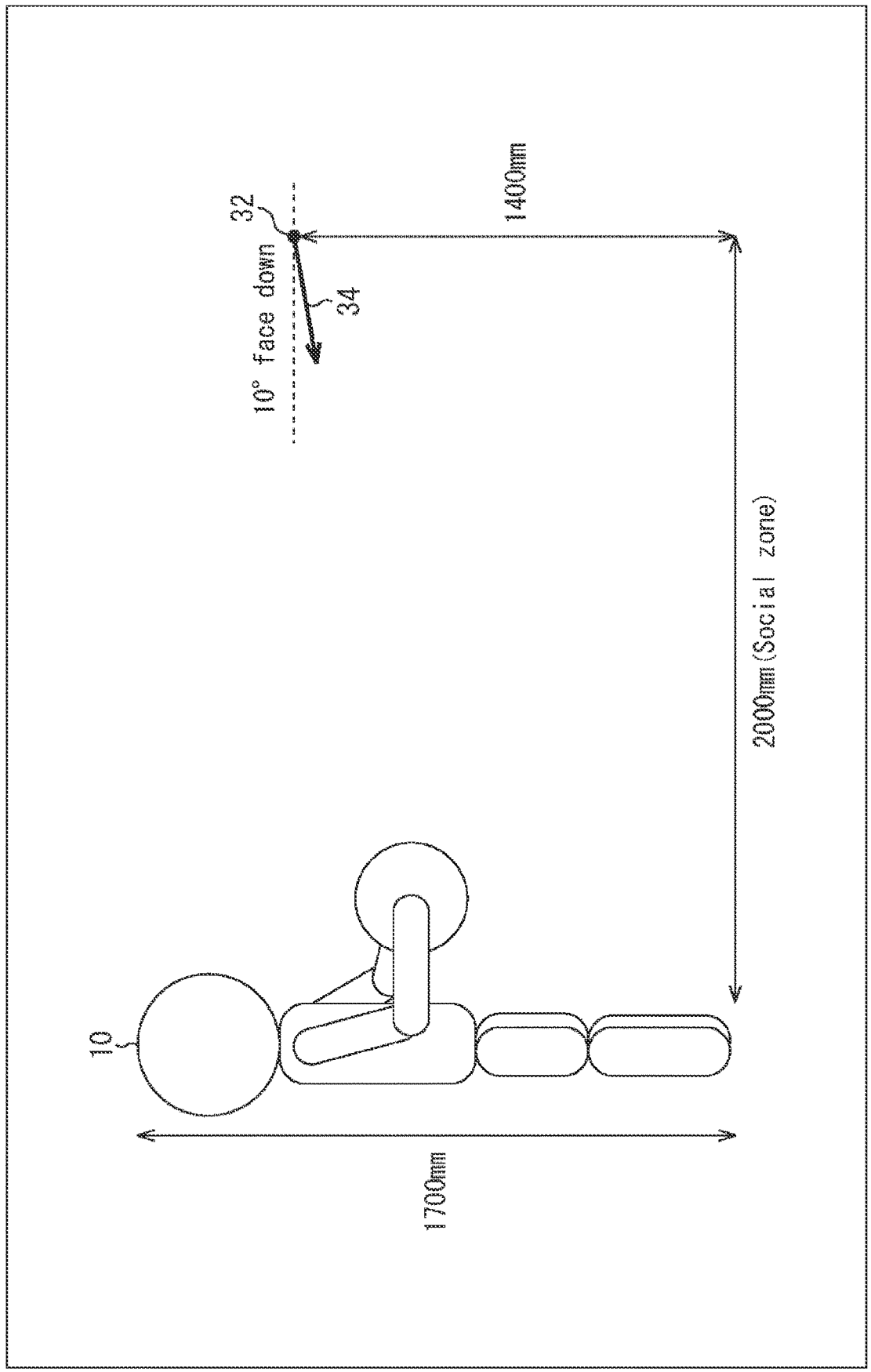
FIG. 5 illustrates an example of Social Zone.

Modes for carrying out the present disclosure (hereinafter referred to as "embodiments") will be described below. Note that the description will be made in the order below.
1. Signals of rendering camera parameters
2. First embodiment (coding device)
3. Second embodiment (reproduction device)
4. Third embodiment (reproduction device)
5. Note

1. Signals of Rendering Camera Parameters

<Documents and the Like that Support Technical Contents and Terms>

The scope disclosed in the present technology includes not only the contents described in the embodiments but also the contents described in the following non-patent documents known at the time of filing.

Non-Patent Document 1: (described above)
Non-Patent Document 2: (described above)
Non-Patent Document 3: (described above)
Non-Patent Document 4: (described above)
Non-Patent Document 5: TELECOMMUNICATION STANDARDIZATION SECTOR OF ITU (International Telecommunication Union), "Advanced video coding for generic audiovisual services", H.264, April 2017
Non-Patent Document 6: TELECOMMUNICATION STANDARDIZATION SECTOR OF ITU (International Telecommunication Union), "High efficiency video coding", H.265, December 2016
Non-Patent Document 7: Jianle Chen, Elena Alshina, Gary J. Sullivan, Jens-Rainer, Jill Boyce, "Algorithm Description of Joint Exploration Test Model 4", JVET-G1001_v1, Joint Video Exploration Team (JVET) of ITU-T SG 16 WP 3 and ISO/IEC JTC 1/SC 29/WG 11 7th Meeting: Torino, IT, 13-21 Jul. 2017

That is, the contents described in the non-patent documents described above are also the basis for determining support requirements. For example, even in a case where a quad-tree block structure described in Non-Patent Document 6 and a quad tree plus binary tree (QTBT) block structure described in Non-Patent Document 7 are not directly described in the embodiments, they are included in the scope of the disclosure of the present technology and meet the support requirements of the claims. Furthermore, for example, technical terms such as parsing, syntax, and semantics are also included in the scope of the disclosure of the present technology and meet the support requirements of the claims even in a case where they are not direct described in the embodiments.

<Point Cloud>

There has conventionally been 3D data such as a point cloud representing a three-dimensional structure based on position information, attribute information, and the like of a group of points, and a mesh that is constituted by vertices, edges, and faces and defines a three-dimensional shape using a polygonal representation.

For example, in the case of a point cloud, a three-dimensional structure (object having a three-dimensional shape) is represented as a set of a large number of points (group of points). That is, point cloud data is constituted by position information and attribute information (e.g., color) of each point in this group of points. Consequently, the data has a relatively simple structure, and any three-dimensional structure can be represented with sufficient accuracy with use of a sufficiently large number of points.

<Outline of Video-Based Approach>

A video-based approach has been proposed, in which a two-dimensional image is formed by projecting each of position information and color information of such a point cloud onto a two-dimensional plane for each subregion, and the two-dimensional image is encoded by an encoding method for two-dimensional images.

In this video-based approach, an input point cloud is divided into a plurality of segmentations (also referred to as regions), and each region is projected onto a two-dimensional plane. Note that data for each position of the point cloud (i.e., data for each point) is constituted by position information (geometry (also referred to as depth)) and attribute information (texture) as described above, and each region is projected onto a two-dimensional plane.

Then, each segmentation (also referred to as a patch) projected onto the two-dimensional plane is arranged to form a two-dimensional image, and is encoded by an encoding method for two-dimensional plane images such as Advanced Video Coding (AVC) or High Efficiency Video Coding (HEVC).

<Image Quality in Rendering>

The 3D data encoded as described above is transmitted as a bitstream and decoded. Then, the three-dimensional structure is rendered as if it has been imaged by a camera at an optional position and orientation, and is converted into a two-dimensional image, and the two-dimensional image is displayed or stored. Note that the two-dimensional image obtained by rendering 3D data is an image different from a two-dimensional image (two-dimensional image in which patches are arranged) at the time of encoding.

A subjective image quality of a two-dimensional image obtained by rendering 3D data is affected by a distance between an object for which the 3D data is rendered and a camera for rendering, a projection method, and the like. The same applies to appearance of compression strain caused by an encoder.

However, it has been difficult for a stream user to perform appropriate rendering without knowing conditions under which a stream creator has performed a quality check at the time of encoding (the distance between a 3D object and the camera, the projection method, and the like).

For example, a point cloud represents an object having a three-dimensional shape as a group of points, and a density of the group of points greatly affects appearance of the object. For example, in a situation in which the group of points is so dense that each point cannot be identified, the group of points is visible as an object (three-dimensional shape), but in a situation in which the group of points is so sparse that each point can be identified, there is a possibility that the group of points becomes less visible as an object (three-dimensional shape).

Then, the subjective density (appearance) of the group of points changes in accordance with a distance between the group of points (three-dimensional shape) and a viewpoint. For example, the farther away the viewpoint is from the group of points, the denser the group of points looks, and the closer the viewpoint is to the group of points, the sparser the group of points looks.

Furthermore, in general, as a 3D data rendering method, there is a method of performing rendering just like capturing an image with a camera (i.e., generating an image like a captured image). In a case of such a method, the camera (also referred to as the camera for rendering) can be at an optional position and orientation as in an example illustrated in FIG. 1. Each of an image 11 to an image 15 illustrated in FIG. 1 is an example of a two-dimensional image obtained by rendering just like imaging an object 10, which is a point cloud, with a camera. As described above, the position and orientation of the camera for rendering can be freely set.

That is, the subjective image quality of the two-dimensional image obtained by rendering the point cloud may be affected by the position of the camera for rendering (particularly the distance between the camera and the object (group of points)). In other words, the appropriate position (or range) of the rendering camera depends on the density of the group of points in the point cloud. The same applies to other types of 3D data, and the appropriate position (or range) of the rendering camera depends on the structure of the 3D data.

However, in a case of a conventional method, such information is not provided, and it has been difficult for a stream user who performs rendering to grasp such an appropriate position of the camera.

For example, in FIG. 1, in a case of the image 12, the distance from the camera to the object 10 is shorter than that in a case of the image 11, and the subjective image quality of the object 10 may be reduced. However, in the conventional method, it has been difficult for a stream user to grasp whether the camera position for the image 11 is appropriate or the camera position for the image 12 is appropriate without checking rendering results.

For example, in general, when a stream creator creates a stream, the stream creator performs a quality check on a two-dimensional image obtained by rendering 3D data. In that case, an appropriate camera position as described above is assumed in accordance with the structure of the 3D data (e.g., in accordance with the density of the group of points in the point cloud), and a quality check is performed on a rendering result at that position. However, in the case of the conventional method, such information is not provided to a stream user, and it has been difficult to grasp the camera position assumed by the stream creator.

Furthermore, for example, it has been difficult to provide the stream user with a camera position, a camera movement trajectory, and the like recommended by the stream creator.

Consequently, it has not been possible for the stream user to grasp an appropriate value to be set as a camera parameter at the time of rendering decoded 3D data, and it has been difficult to perform appropriate rendering.

<Signals of Information Regarding Camera>

Thus, information regarding a camera for rendering 3D data (e.g., a point cloud that represents an object having a three-dimensional shape as a group of points) is provided to a decoding side in association with the 3D data. For example, the information regarding the camera may be included in a bitstream of 3D data as metadata to be used to render 3D data (e.g., a point cloud) and transmitted to the decoding side.

Thus, the information regarding the camera can be acquired on the decoding side. Then, using the information regarding the camera allows for easier and more appropriate rendering.

<Information Regarding Camera>

<Camera Parameter Index>

The information regarding the camera may be any information as long as it relates to a camera for rendering 3D data. For example, various types of information as shown in Table 21 in FIG. 2 may be included.

For example, as shown in the first row (excluding an item name row) from the top of Table 21, information regarding the camera may include a camera parameter index, which is an index indicating a defined camera parameter (a camera parameter with a preset a condition for the camera for rendering).

Camera parameters are parameters related to the camera for rendering 3D data. Specifically, the camera parameters may include any parameters. For example, as in syntax 31 illustrated in FIG. 3A, the camera parameters may include x, y, and z coordinates (camera_pos_x, camera_pos_y, camera_pos_z) that indicate the position of the camera, that is, a camera position coordinate (camera_pos) 32 in FIG. 3B.

Furthermore, the camera parameters may include x, y, and z coordinates (center_pos_x, center_pos_y, center_pos_z) that indicate a position of a camera gaze point, that is, a camera gaze point coordinate (center_pos) 33 in FIG. 3B. Note that, instead of the camera gaze point, a vector 34 from the camera position coordinate (camera_pos) 32 to the camera gaze point coordinate (center_pos) 33 illustrated in FIG. 3B may be included in the camera parameters. These parameters indicate a direction (orientation) of the camera.

Furthermore, the camera parameters may include a vector indicating an upward direction of the camera (camera_up_x, camera_up_y, camera_up_z), that is, a vector (camera_up) 35 indicating the upward direction of the camera in FIG. 3B Note that the camera gaze point coordinate 33 (vector 34) and the vector 35 indicating the upward direction of the camera are also parameters indicating a posture of the camera.

Furthermore, the camera parameters may include a parameter indicating the projection method of the camera, that is, a rendering method. For example, as a parameter indicating the projection method of the camera, a parameter (PerspectiveProjection) indicating whether or not the projection method is a perspective projection may be included. Furthermore, for example, as a parameter indicating the projection method of the camera, a parameter indicating whether or not the projection method is a parallel projection may be included. Moreover, as a parameter indicating the projection method of the camera, a parameter indicating whether the projection method is a perspective projection or a parallel projection may be included.

Furthermore, the camera parameters may include a parameter (field of view (FOV)) indicating an angle of view of the camera.

The camera parameter index may indicate any camera parameter as long as it indicates a defined camera parameter, and may be an index of any value.

For example, as shown in Table 41 in FIG. 4, the camera parameter index may indicate a defined imaging situation (camera position, orientation, posture, or the like). That is, a camera parameter that realizes a situation corresponding to a value of a camera parameter index may be specified by specifying the camera parameter index.

In the case of the example of Table 41 in FIG. 4, index "0" indicates a situation referred to as "Social Zone", index "1" indicates a situation referred to as "Friendship Zone", and index "2" indicates a situation referred to as "Intimate Zone".

"Social Zone" indicates, as shown in the table, a situation in which the camera is located at a distance of 2 m from a 3D object and 1.4 m from the ground, and faces 10 degrees downward from a horizontal direction. That is, when this situation is specified, the camera position coordinate (camera_pos) 32 is set to a position 2000 mm away from the object 10 and 1400 mm from the ground as illustrated in FIG. 5. Furthermore, the vector 34 is set to a direction 10 degrees downward from the horizontal direction (10° face down).

Figure 6:
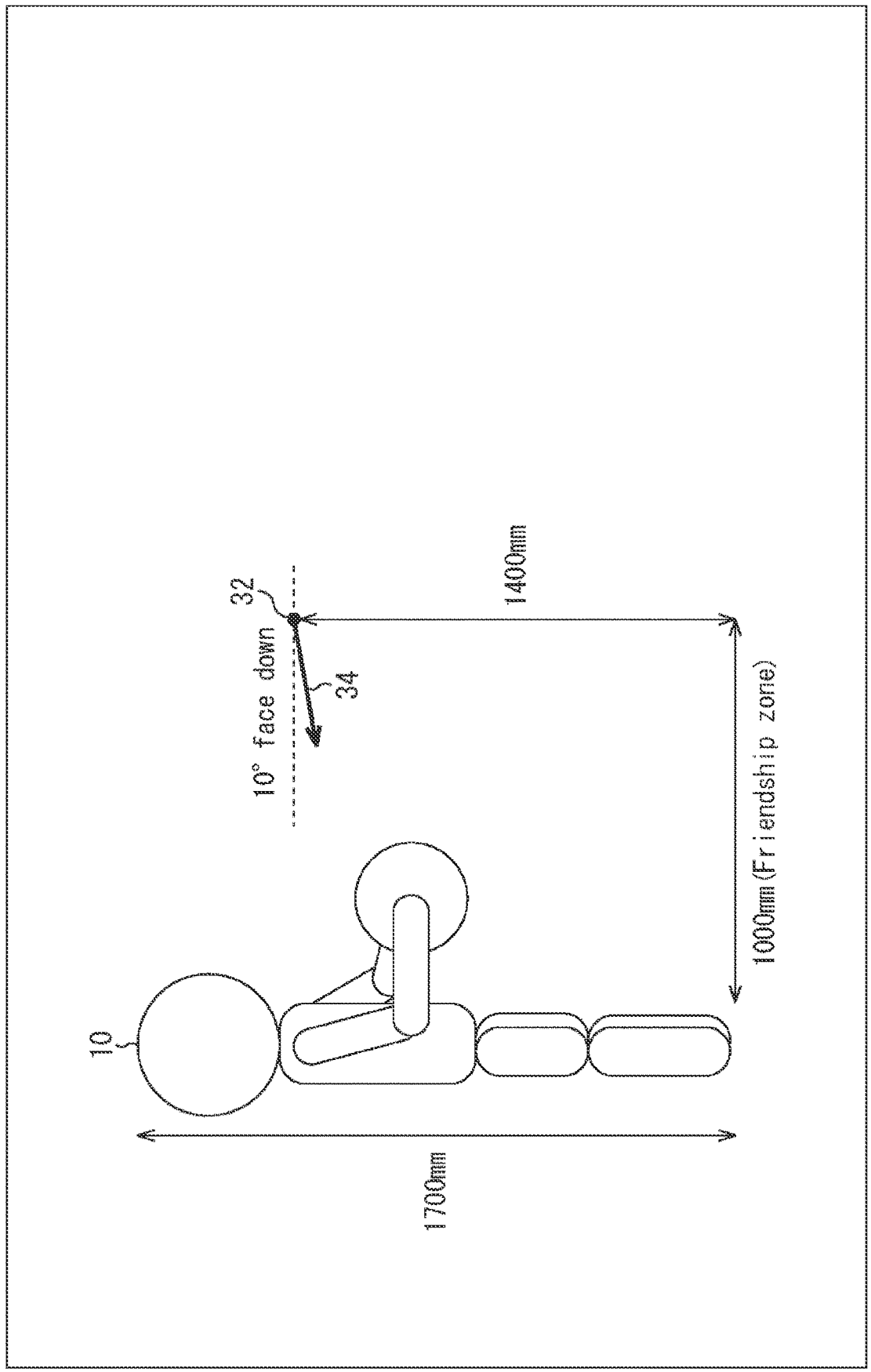
FIG. 6 illustrates an example of Friendship Zone.

"Friendship Zone" indicates, as shown in the table, a situation in which the camera is located at a distance of 1 m from the 3D object and 1.4 m from the ground, and faces 10 degrees downward from the horizontal direction. That is, when this situation is specified, the camera position coordinate (camera_pos) 32 is set to a position 1000 mm away from the object 10 and 1400 mm from the ground as illustrated in FIG. 6. Furthermore, the vector 34 is set to a direction 10 degrees downward from the horizontal direction (10° face down).

Figure 7:
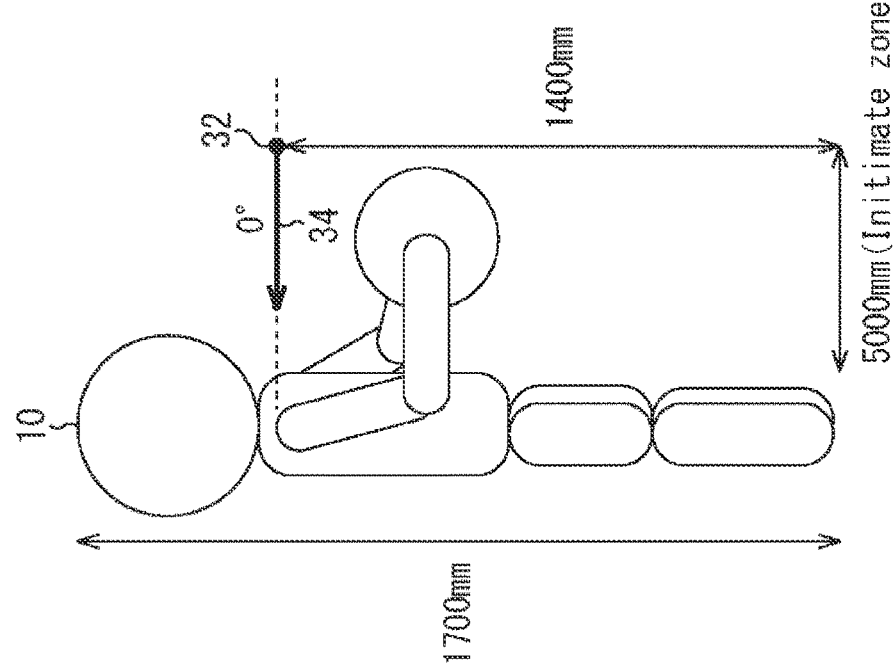
FIG. 7 illustrates an example of Intimate Zone.

"Intimate Zone" indicates, as shown in the table, a situation in which the camera is located at a distance of 0.5 m from the 3D object and 1.4 m from the ground, and faces in the horizontal direction. That is, when this situation is specified, the camera position coordinate (camera_pos) 32 is set to a position 500 mm away from the object 10 and 1400 mm from the ground as illustrated in FIG. 7. Furthermore, the vector 34 is set in the horizontal direction (0°).

A correspondence relationship between such a situation (corresponding camera parameter) and a camera parameter index is specified in advance by, for example, a standard, and the relationship is grasped in advance on an encoding side and the decoding side. Consequently, on both the encoding side and the decoding side, it is possible to easily specify a camera parameter that realizes a situation as described above simply by specifying a camera parameter index.

Note that any camera parameter may be specified by a camera parameter index, and such a camera parameter is not limited to the examples described above. Furthermore, any situation may be specified by a camera parameter index, and such a situation is not limited to the examples described above. Moreover, the number of camera parameter indexes specified in advance is optional. The number is not limited to the example described above, and may be two or less, or may be four or more. Furthermore, the camera parameter indexes may be set to any values, and the values are not limited to the example described above (0 to 2).

A camera parameter specified by such a camera parameter index may be set at the time of rendering so that rendering can be performed in a situation specified by the camera parameter index.

For example, in a case where the camera parameter is set on the basis of camera parameter index "0", rendering can be performed in "Social Zone", and an image 51 as illustrated in FIG. 8 is obtained. In this case, the camera position is relatively far from the object 10, and the image 51 shows the whole of the object 10 (whole body).

For example, in a case where the camera parameter is set on the basis of camera parameter index "2", rendering can be performed in "Intimate Zone", and an image 52 as illustrated in FIG. 8 is obtained. In this case, the camera position is relatively close to the object 10, and the image 52 shows only a part (upper body) of the object 10.

As described above, an image of a situation specified by the index is obtained.

For example, on the encoding side, a sequence creator (stream creator) selects a situation in which an image of a sufficient quality (subjective image quality) can be obtained by performing a quality check at the time of encoding, and sets a camera parameter index indicating the situation. The camera parameter index is included in a bitstream as information regarding the camera, and transmitted to the decoding side. Thus, on the decoding side, a sequence user (stream user) can use the camera parameter index to easily perform rendering in the situation in which an image of sufficient quality (subjective image quality) can be obtained.

For example, the sequence creator can use this camera parameter index to notify, more easily, the decoding side of a recommended situation or a situation where an acceptable quality is obtained. In other words, the sequence user can more easily grasp those situations specified by the sequence creator.

That is, transmitting this camera parameter index from the encoding side to the decoding side allows the sequence creator to specify an appropriate situation (camera position, orientation, or the like), and the sequence user to more easily grasp the appropriate situation (situation in which quality is guaranteed). Consequently, rendering can be performed more easily and more appropriately.

Note that a camera parameter index can be used to specify a plurality of camera parameters, and it is therefore possible to suppress a reduction in coding efficiency as compared with a case of transmitting information in which each camera parameter is individually specified. Furthermore, the sequence creator is only required to perform a quality check in the situation specified by this camera parameter index, and this allows the quality check to be performed more easily, for example, it is not necessary to consider a value to which each camera parameter is to be set. Furthermore, during a quality check, a situation specified by the camera parameter index can be applied so that the situation can be communalized regardless of sequence. That is, quality evaluation can be performed on a plurality of sequences under the same conditions.

Note that the number of camera parameter indexes transmitted from the encoding side to the decoding side is optional, and may be one, or may be two or more.

<Camera Parameter Category Index>

Furthermore, information regarding the camera may include a camera parameter category index, which is an index that identifies a purpose of the camera for rendering, as shown in the second row (excluding the item name row) from the top of Table 21 in FIG. 2, for example. That is, the camera parameter category index has a value that specifies the purpose of the camera situation realized by a set camera parameter.

The purpose of the camera specified by this camera parameter category index is optional. That is, the camera parameter category index may specify any purpose of the camera. FIG. 9 illustrates an example of the camera parameter category index.

In the case of the example of Table 61 in FIG. 9, index "0" indicates that the purpose of the camera is a quality check at the time of encoding. That is, index "0" indicates that the camera situation has been used for a quality check at the time of encoding. In other words, the camera situation is a situation in which a quality check has been performed (a situation in which the quality is guaranteed).

Furthermore, index "1" indicates that the purpose of the camera is a recommended angle. That is, index "1" indicates that the camera situation is a situation (i.e., an angle) recommended by a sequence creator (encoding side). For example, such a value is set for the first frame (1st frame).

Moreover, index "2" indicates that the purpose of the camera is a recommended camera path (recommended movement trajectory of the camera). That is, index "2" indicates that the set camera movement is a movement trajectory of the camera recommended by the sequence creator (encoding side).

A correspondence relationship between such a purpose of the camera and a camera parameter category index is specified in advance by, for example, a standard, and the relationship is grasped in advance on the encoding side and the decoding side. Consequently, on the encoding side, it is possible to easily specify the purpose of the camera as described above simply by specifying a camera parameter category index. Furthermore, on the decoding side, the purpose of the camera as described above can be easily grasped on the basis of the camera parameter category index.

Note that any purpose of the camera may be specified by a camera parameter category index, and such a camera purpose is not limited to the examples described above. Furthermore, the number of camera parameter category indexes specified in advance is optional. The number is not limited to the example described above, and may be two or less, or may be four or more. Moreover, the camera parameter category indexes may be set to any values, and the values are not limited to the example described above (0 to 2).

For example, at the time of rendering, the set purpose of the camera can be easily grasped on the basis of such a camera parameter category index. Consequently, whether or not to apply the camera parameter to rendering can be determined more easily and more appropriately.

For example, in a case where rendering is performed with a quality-guaranteed camera, a camera parameter specified by camera parameter category index "0" may be applied. Furthermore, for example, in a case where rendering is performed at an angle recommended by the sequence creator, a camera parameter specified by camera parameter category index "1" may be applied. Moreover, for example, in a case where rendering is performed with a movement trajectory of the camera recommended by the sequence creator, a camera parameter specified by camera parameter category index "2" may be applied.

This allows a sequence user (stream user) on the decoding side to easily check the purpose of the camera before using the camera parameter. Consequently, rendering can be performed more easily and more appropriately.

Note that, on the encoding side, the sequence creator (stream creator) can easily notify the decoding side of the purpose of the camera by using this camera parameter category index.

Note that the number of camera parameter category indexes transmitted from the encoding side to the decoding side is optional, and may be one, or may be two or more.

<Conversion Rate>

Furthermore, the information regarding the camera may include a conversion rate (frame to world scale) between a scale in a two-dimensional image obtained by rendering 3D data (e.g., a point cloud) and a real scale, as shown in the third row (excluding the item name row) from the top of Table 21 in FIG. 2, for example.

In general, it is possible to use a scale in 3D data or a rendered image different from a scale in the real world. Consequently, a conversion rate between those scales can be set and used so that a camera parameter can be set in, for example, a real scale.

For example, on the encoding side, a camera parameter is set in the real scale, the conversion rate described above is set, and they are transmitted as information regarding the camera. Thus, on the decoding side, the conversion rate can be used so that the camera parameter set in the real scale can be converted more easily into a camera parameter in a scale in an image after rendering. Consequently, on the decoding side, the camera parameter set in the real scale can be applied more easily. Furthermore, on the encoding side, it is not necessary to consider the scale in the image after rendering, and the camera parameter can be set more easily.

Note that the number of conversion rates transmitted from the encoding side to the decoding side is optional, and may be one, or may be two or more. For example, a plurality of rates that differs from each other may be transmitted.

<Bounding Box>

Furthermore, the information regarding the camera may include a camera parameter that is set with use of a bounding box as a reference, as shown in the fourth row (excluding the item name row) from the top of Table 21 in FIG. 2, for example.

A bounding box is information for normalizing position information of a coding target, and is a region formed so as to surround an object in 3D data, which is the coding target. This bounding box may have any shape. For example, the bounding box may have a rectangular parallelepiped shape.

In a case of setting camera parameters indicating the position, direction, and the like of the camera, it is necessary to set a reference position for the camera parameters. For example, it is conceivable to use an object to be a subject of the camera as a reference. However, objects move in some cases, and such an object can be difficult to use as a reference. Thus, a bounding box is used as a reference for the camera parameters.

Incidentally, a bounding box can be set in a flexible manner. For example, in a case of a moving object, a bounding box may be set so as to surround the object in each frame (for each predetermined time), or may be set so as to surround the object at all times.

Figure 10:
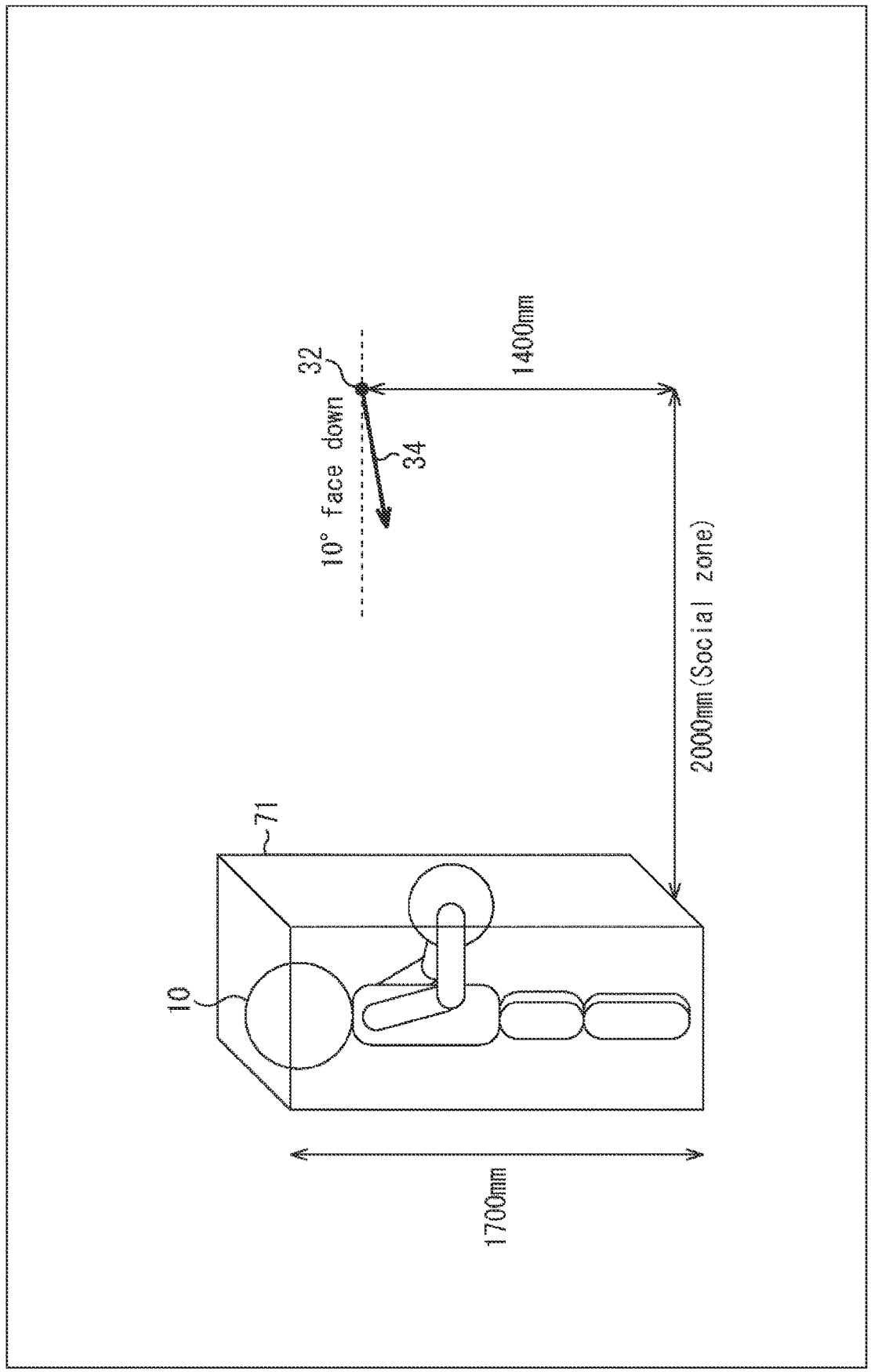
FIG. 10 illustrates an example of a bounding box.

Thus, for example, as illustrated in FIG. 10, camera parameters (camera position coordinate 32, vector 34, and the like) may be set with use of, as a reference, a bounding box 71 set so as to surround the position of the moving object 10 in the first frame.

Figure 11:
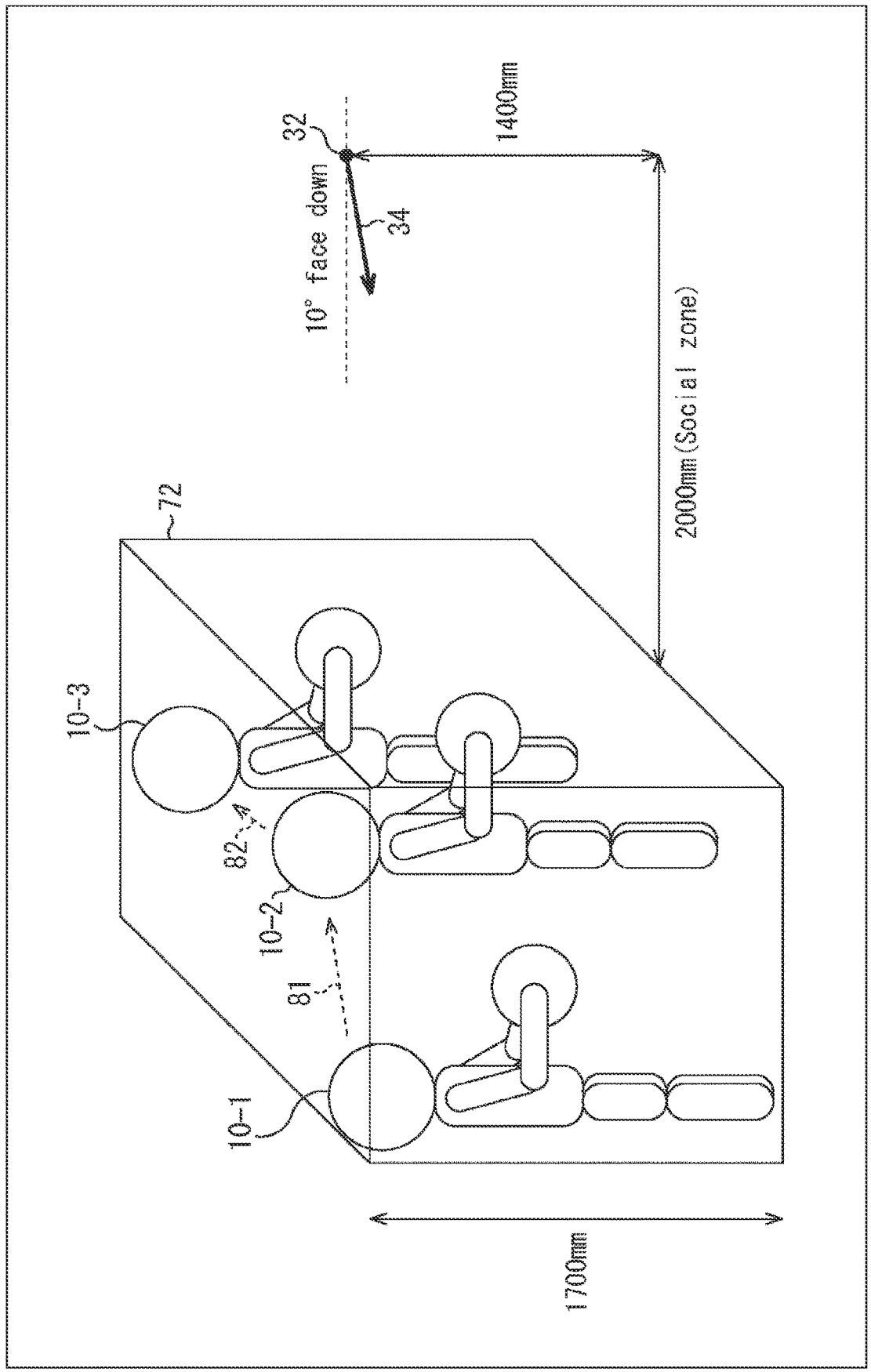
FIG. 11 illustrates an example of a bounding box.

Furthermore, for example, as illustrated in FIG. 11, camera parameters (camera position coordinate 32, vector 34, and the like) may be set with use of, as a reference, a bounding box 72 set so as to surround all the positions of the object 10 (a moving range of the object 10) during the entire sequence or a predetermined period. In the case of the example in FIG. 11, the object 10 moves from the position of an object 10-1 to the position of an object 10-2 as indicated by a dotted arrow 81, and further moves from the position of the object 10-2 to the position of an object 10-3 as indicated by a dotted arrow 82. The bounding box 72 is set so as to surround the object at all of these positions.

Using a bounding box as a reference as described above allows camera parameters to be more easily set for the moving object 10 regardless of its movement.

Note that a reference position for camera parameters may be any position with respect to a bounding box. For example, a predetermined position in the bounding box (e.g., the center) may be used as the reference position for the camera parameters, a predetermined position on a boundary between the inside and outside of the bounding box may be used as the reference position for the camera parameters, or a predetermined position outside the bounding box may be used as the reference position for the camera parameters.

For example, the position of the object 10 at a predetermined time in the bounding box may be used as the reference position for the camera parameters. Furthermore, for example, the center of gravity of the positions of the moving object 10 in the bounding box at all times may be used as the reference position for the camera parameters.

Note that information regarding a bounding box is specifically optional, and any information regarding the bounding box may be included. For example, information such as the position, size, shape, and target time range of the bounding box may be included.

Such information regarding a bounding box may be transmitted from the encoding side to the decoding side so that camera parameters set with use of the bounding box as a reference can be more easily interpreted on the decoding side, with interpretation similar to that on the encoding side.

<Camera Parameter>

Furthermore, information regarding the camera may include a camera parameter, as shown in the fifth row (excluding the item name row) from the top of Table 21 in FIG. 2, for example. As described above in <Camera parameter index>, camera parameters are parameters related to the camera for rendering 3D data, and specifically may include any parameters. For example, the camera parameters may include the camera position coordinate (camera_pos) 32, the camera gaze point coordinate (center_pos) 33, the vector 34, the vector 35 indicating the upward direction of the camera, the projection method of the camera, and a parameter indicating the angle of view of the camera, or may include any other parameters.

That is, the camera parameters may be set directly without indexes. Furthermore, the camera parameters may be used in combination with the camera parameter indexes described above for an update of values of some of the camera parameters set in accordance with the camera parameter indexes. Moreover, other camera parameters that are not set with use of the camera parameter indexes may be additionally set. Note that the number of camera parameters that can be set is optional, and may be one, or may be two or more.

The camera parameters can be set directly as described above, and this improves a degree of freedom in setting the camera parameters as compared with a case of using indexes. Furthermore, the camera parameters may be transmitted from the encoding side to the decoding side, so that the camera parameters that have been set more freely can be applied to rendering on the decoding side. Consequently, rendering can be performed more easily and more appropriately.

<Camera Path>

Furthermore, the information regarding the camera may include information regarding a movement trajectory of the camera for rendering, as shown in the sixth row (excluding the item name row) from the top of Table 21 in FIG. 2, for example. For example, the information regarding the movement trajectory of the camera for rendering may include a camera activation trajectory parameter (camera path) indicating the movement trajectory of the camera for rendering.

A camera movement trajectory parameter (camera path) indicates a trajectory of a movement in a case where the camera for rendering is moved to a different position, orientation, or the like. Such information may be transmitted from the encoding side to the decoding side so that, for example, a sequence creator can provide a recommended camera work to the decoding side. Furthermore, on the decoding side, the information transmitted as described above can be used for easier generation of an image obtained by rendering in which the recommended camera work is replicated. Note that a movement of the camera indicated by this trajectory may be a continuous movement or a discrete movement.

<Object Path>

Furthermore, the information regarding the camera may include information regarding a movement trajectory of an object to be the subject of the camera, as shown in the seventh row (excluding the item name row) from the top of Table 21 in FIG. 2, for example. For example, the information regarding the movement trajectory of the object may include an object activation trajectory parameter (object path) indicating the movement trajectory of the object.

As described above in <Bounding box>, a 3D data object is capable of a variety of motions and deformations. For example, the object can move, turn, deform, expand, or shrink. An object movement trajectory parameter (object path) indicates a trajectory of such motions and deformations of the object. Such information may be transmitted from the encoding side to the decoding side so that, for example, motions and deformations of the object can be more easily grasped on the decoding side. Consequently, for example, it is possible to set, more easily, a more appropriate camera work (a camera work more appropriate for motions and deformations of the object) of the camera for rendering. Note that a movement of the object indicated by this trajectory may be a continuous movement or a discrete movement.

<Metadata>

The above-described information regarding the camera for rendering 3D data may be, for example, added as metadata to a bitstream that includes coded data of a two-dimensional plane image obtained by projecting 3D data.

In that case, for example, as illustrated in FIG. 12A, such information may be added to a bitstream as metadata (e.g., as a picture parameter set) of the first frame of a moving image constituted by frame images, which are two-dimensional plane images obtained by projecting 3D data. For example, in FIG. 12A, information regarding the camera for rendering 3D data is added to a bitstream as metadata 91 (picture parameter set) of the first frame (frame #0) of a moving image.

Furthermore, for example, as illustrated in FIG. 12B, the metadata 91 may be updated at any frame of the moving image constituted by frame images, which are two-dimensional plane images obtained by projecting 3D data. For example, in FIG. 12B, the information regarding the camera for rendering 3D data is added to the bitstream as metadata 91-1 of the first frame (frame #0) of the moving image and metadata 91-2 of the fifth frame (frame #4).

2. First Embodiment

<Coding Device>

Figure 13:
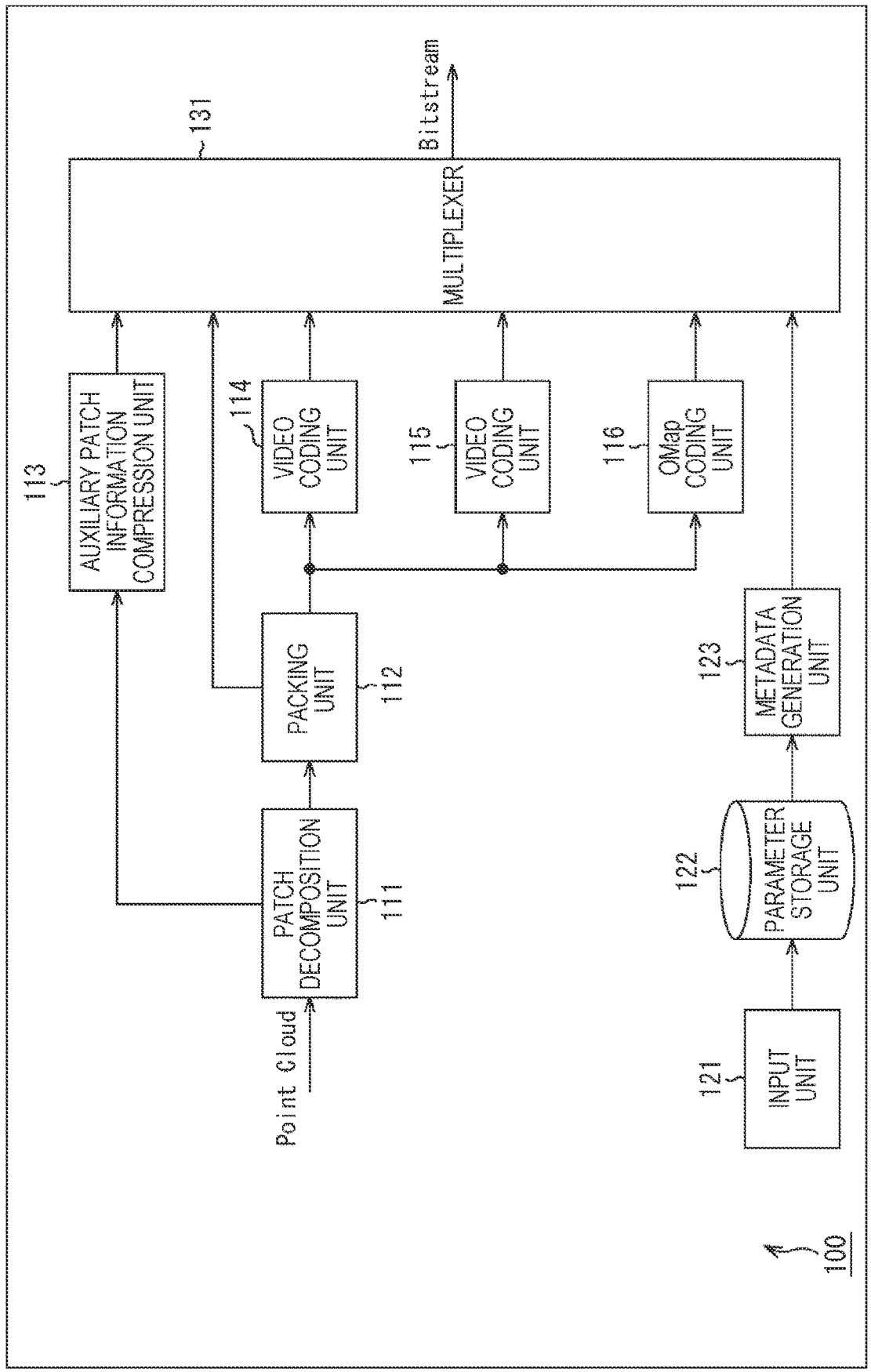
FIG. 13 is a block diagram illustrating an example of a main configuration of a coding device.

Next, a configuration that enables transmission of information regarding a camera as described above will be described. FIG. 13 is a block diagram illustrating an example of a configuration of a coding device, which is an aspect of an image processing apparatus to which the present technology is applied. A coding device 100 illustrated in FIG. 13 is a device (a coding device to which a video-based approach is applied) that projects 3D data such as a point cloud onto a two-dimensional plane and performs encoding by an encoding method for two-dimensional images.

Note that FIG. 13 illustrates a main part of processing units, a data flow, and the like, and not all of them are illustrated in FIG. 13. That is, the coding device 100 may include a processing unit that is not illustrated as a block in FIG. 13, or may involve a flow of processing or data that is not illustrated as an arrow or the like in FIG. 13. This also applies to other drawings for describing processing units and the like in the coding device 100.

As illustrated in FIG. 13, the coding device 100 includes a patch decomposition unit 111, a packing unit 112, an auxiliary patch information compression unit 113, a video coding unit 114, a video coding unit 115, an OMap coding unit 116, an input unit 121, a parameter storage unit 122, a metadata generation unit 123, and a multiplexer 131.

The patch decomposition unit 111 performs processing related to decomposition of 3D data. For example, the patch decomposition unit 111 acquires 3D data (e.g., point cloud) representing a three-dimensional structure input to the coding device 100. Furthermore, the patch decomposition unit 111 decomposes the acquired point cloud into a plurality of segmentations, projects the point cloud onto a two-dimensional plane for each segmentation, and generates position information patches and attribute information patches. The patch decomposition unit 111 supplies information regarding each generated patch to the packing unit 112. Furthermore, the patch decomposition unit 111 supplies auxiliary patch information, which is information regarding the decomposition, to the auxiliary patch information compression unit 113.

The packing unit 112 performs processing related to data packing. For example, the packing unit 112 acquires, from the patch decomposition unit 111, information regarding a patch of position information (geometry) indicating a position of a point and information regarding a patch of attribute information (texture) such as color information added to the position information.

Furthermore, the packing unit 112 arranges each of the acquired patches on a two-dimensional image and packs them as a video frame. For example, the packing unit 112 arranges position information patches on a two-dimensional image and packs them as a position information video frame (also referred to as a geometry video frame). Furthermore, for example, the packing unit 112 arranges attribute information patches on a two-dimensional image and packs them as an attribute information video frame (also referred to as a color video frame).

Furthermore, the packing unit 112 generates an occupancy map corresponding to these video frames. Moreover, the packing unit 112 performs dilation processing on a color video frame.

The packing unit 112 supplies the geometry video frame generated as described above to the video coding unit 114. Furthermore, the packing unit 112 supplies the color video frame generated as described above to the video coding unit 115. Moreover, the packing unit 112 supplies the occupancy map generated as described above to the OMap coding unit 116. Furthermore, the packing unit 112 supplies control information regarding such packing to the multiplexer 131.

The auxiliary patch information compression unit 113 performs processing related to compression of auxiliary patch information. For example, the auxiliary patch information compression unit 113 acquires data supplied from the patch decomposition unit 111. The auxiliary patch information compression unit 113 encodes (compresses) auxiliary patch information included in the acquired data. The auxiliary patch information compression unit 113 supplies coded data of the obtained auxiliary patch information to the multiplexer 131.

The video coding unit 114 performs processing related to encoding of a video frame of position information (geometry). For example, the video coding unit 114 acquires a geometry video frame supplied from the packing unit 112. Furthermore, the video coding unit 114 encodes the acquired geometry video frame by an optional encoding method for two-dimensional images such as AVC or HEVC. The video coding unit 114 supplies coded data (coded data of the geometry video frame) obtained by the encoding to the multiplexer 131.

The video coding unit 115 performs processing related to encoding of a video frame of attribute information (texture). For example, the video coding unit 115 acquires a color video frame supplied from the packing unit 112. Furthermore, the video coding unit 115 encodes the acquired color video frame by an optional encoding method for two-dimensional images such as AVC or HEVC. The video coding unit 115 supplies coded data (coded data of the color video frame) obtained by the encoding to the multiplexer 131.

The OMap coding unit 116 performs processing related to encoding of an occupancy map. For example, the OMap coding unit 116 acquires an occupancy map supplied from the packing unit 112. Furthermore, the OMap coding unit 116 encodes the acquired occupancy map by an optional encoding method such as arithmetic coding. The OMap coding unit 116 supplies coded data (coded data of the occupancy map) obtained by the encoding to the multiplexer 131.

The input unit 121 has an optional input device, and performs processing related to receiving of an input from outside of the coding device 100. For example, the input unit 121 accepts an operation of inputting camera parameters related to a camera for rendering 3D data by a user (stream creator or the like). For example, the input unit 121 receives various types of information as described in <1. Signals of rendering camera parameters> with reference to Table 21 in FIG. 2 and the like. The input unit 121 supplies and stores the received camera parameters to the parameter storage unit 122 as information regarding the camera for rendering 3D data.

The parameter storage unit 122 has an optional storage medium such as a hard disk or a semiconductor memory, and performs processing related to storage of parameters (information regarding the camera for rendering 3D data). For example, the parameter storage unit 122 acquires parameters supplied from the input unit 121 and stores them in the storage medium.

Furthermore, for example, the parameter storage unit 122 supplies the stored parameters to the metadata generation unit 123 at a predetermined timing. Moreover, for example, the parameter storage unit 122 reads, from the storage medium, a parameter requested by the metadata generation unit 123, and supplies the parameter to the metadata generation unit 123.

The metadata generation unit 123 performs processing related to generation of metadata to be used to render 3D data. For example, the metadata generation unit 123 requests a parameter from the parameter storage unit 122 and acquires the parameter. Furthermore, for example, the metadata generation unit 123 acquires a parameter supplied from the parameter storage unit 122. Moreover, for example, the metadata generation unit 123 generates metadata that includes the acquired parameter as metadata to be used to render 3D data, and supplies the metadata to the multiplexer 131. That is, the metadata generation unit 123 generates metadata that includes various types of information (information regarding the camera for rendering 3D data) as described in <1. Signals of rendering camera parameters> with reference to Table 21 in FIG. 2 and the like.

The multiplexer 131 performs processing related to bitstream generation (information multiplexing). For example, the multiplexer 131 acquires coded data of auxiliary patch information supplied from the auxiliary patch information compression unit 113. Furthermore, the multiplexer 131 acquires control information regarding packing supplied from the packing unit 112. Moreover, the multiplexer 131 acquires coded data of a geometry video frame supplied from the video coding unit 114. Furthermore, the multiplexer 131 acquires coded data of a color video frame supplied from the video coding unit 115. Moreover, the multiplexer 131 acquires coded data of an occupancy map supplied from the OMap coding unit 116. Furthermore, the multiplexer 131 acquires metadata supplied from the metadata generation unit 123.

The multiplexer 131 multiplexes the acquired information to generate a bitstream. That is, the multiplexer 131 generates a bitstream that includes coded data of a two-dimensional plane image obtained by projecting 3D data and metadata corresponding to the coded data.

As described above, this metadata is metadata to be used to render 3D data, and includes various types of information (information regarding the camera for rendering 3D data) as described in <1. Signals of rendering camera parameters> with reference to Table 21 in FIG. 2 and the like. Consequently, the coding device 100 can obtain the effect as described above in <1. Signals of rendering camera parameters>. Consequently, the coding device 100 allows for easier and more appropriate rendering on the decoding side.

<Flow of Coding Processing>

Next, an example of a flow of coding processing executed by the coding device 100 will be described with reference to a flowchart in FIG. 14.

When the coding processing is started, the input unit 121 of the coding device 100 receives an input of parameters (information regarding a camera for rendering 3D data) in step S101.

In step S102, the parameter storage unit 122 stores the parameters received in step S121.

In step S103, the metadata generation unit 123 determines whether or not metadata of a frame to be processed (also referred to as a current frame) is to be generated. If it is determined that metadata is to be generated, the processing proceeds to step S104.

In step S104, the metadata generation unit 123 generates metadata to be used to render 3D data. Specifically, the metadata generation unit 123 generates metadata that includes the parameters stored in step S102 (i.e., information regarding the camera for rendering 3D data). That is, the metadata generation unit 123 generates metadata that includes various types of information as described in <1. Signals of rendering camera parameters> with reference to Table 21 in FIG. 2 and the like.

When the processing of step S104 ends, the processing proceeds to step S105. Furthermore, if it is determined in step S103 that metadata corresponding to a frame to be processed is not to be generated, the processing of step S104 is skipped (omitted), and the processing proceeds to step S105.

In step S105, the patch decomposition unit 111 to the OMap coding unit 116 and the multiplexer 131 execute point cloud coding processing to encode a point cloud, and generate a bitstream that includes the coded data and metadata generated in the processing of step S104.

In step S106, the coding device 100 determines whether or not all the frames have been processed. If it is determined that there is an unprocessed frame, the processing returns to step S103, and the subsequent processing is repeated for the new frame to be processed. The processing of step S103 to step S106 is repeated as described above, and if it is determined in step S106 that all the frames have been processed, the coding processing ends.

<Flow of Point Cloud Coding Processing>

Next, an example of a flow of point cloud coding processing executed in step S105 of FIG. 14 will be described with reference to a flowchart in FIG. 15.

When the point cloud coding processing is started, the patch decomposition unit 111 of the coding device 100 projects an input point cloud onto a two-dimensional plane, and decomposes the point cloud into patches in step S121. Furthermore, the patch decomposition unit 111 generates auxiliary patch information for the decomposition.

In step S122, the auxiliary patch information compression unit 113 compresses (encodes) the auxiliary patch information generated in step S121.

In step S123, the packing unit 112 arranges each patch of position information and attribute information generated in step S121 on a two-dimensional image, and packs the patches as a video frame. Furthermore, the packing unit 112 generates an occupancy map. Moreover, the packing unit 112 performs dilation processing on a color video frame. Furthermore, the packing unit 112 generates control information regarding such packing.

In step S124, the video coding unit 114 encodes the geometry video frame generated in step S123 by an encoding method for two-dimensional images.

In step S125, the video coding unit 115 encodes the color video frame generated in step S123 by the encoding method for two-dimensional images.

In step S126, the OMap coding unit 116 encodes the occupancy map generated in step S123 by a predetermined encoding method.

In step S127, the multiplexer 131 determines whether or not metadata exists. If metadata has been generated in step S104 of FIG. 14 and it is determined that the metadata exists, the processing proceeds to step S128.

Figure 14:
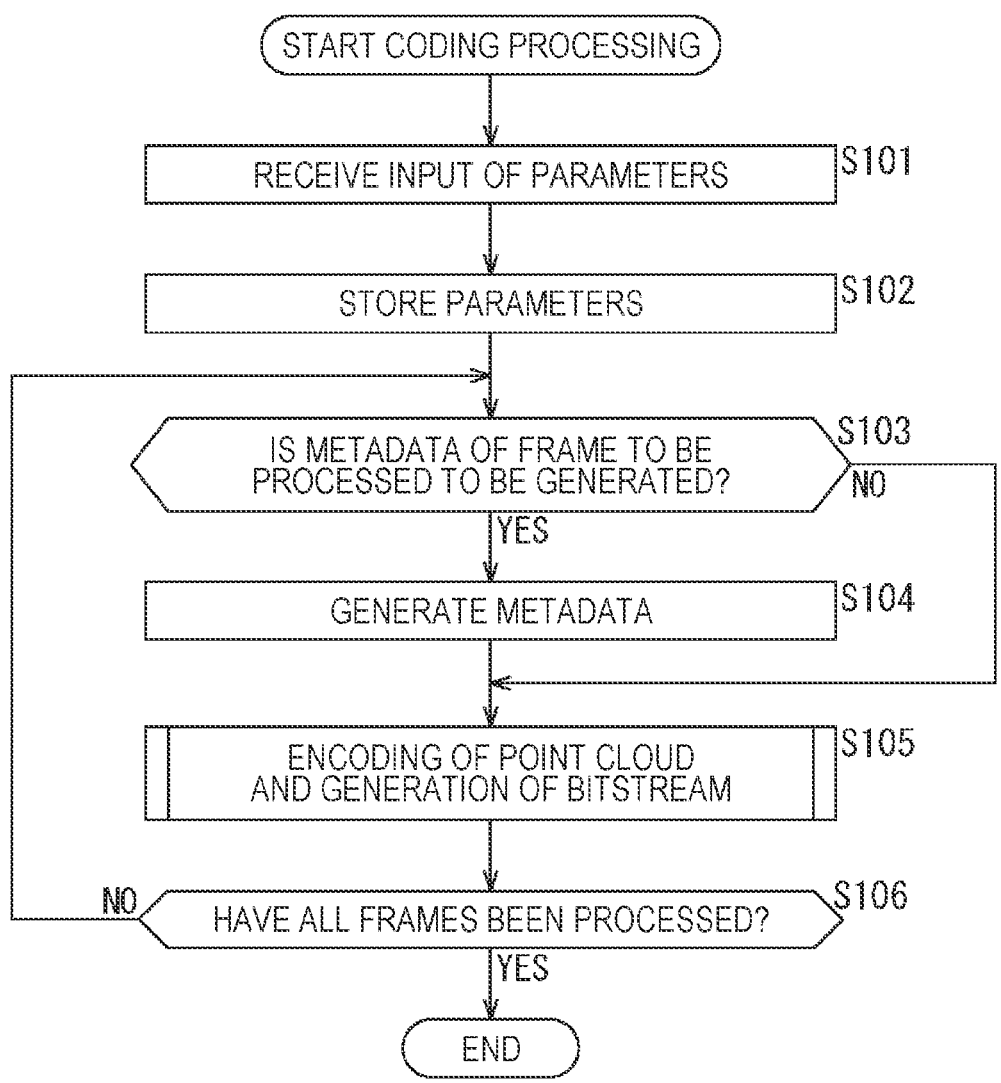
FIG. 14 is a flowchart illustrating an example of a flow of coding processing.
Figure 15:
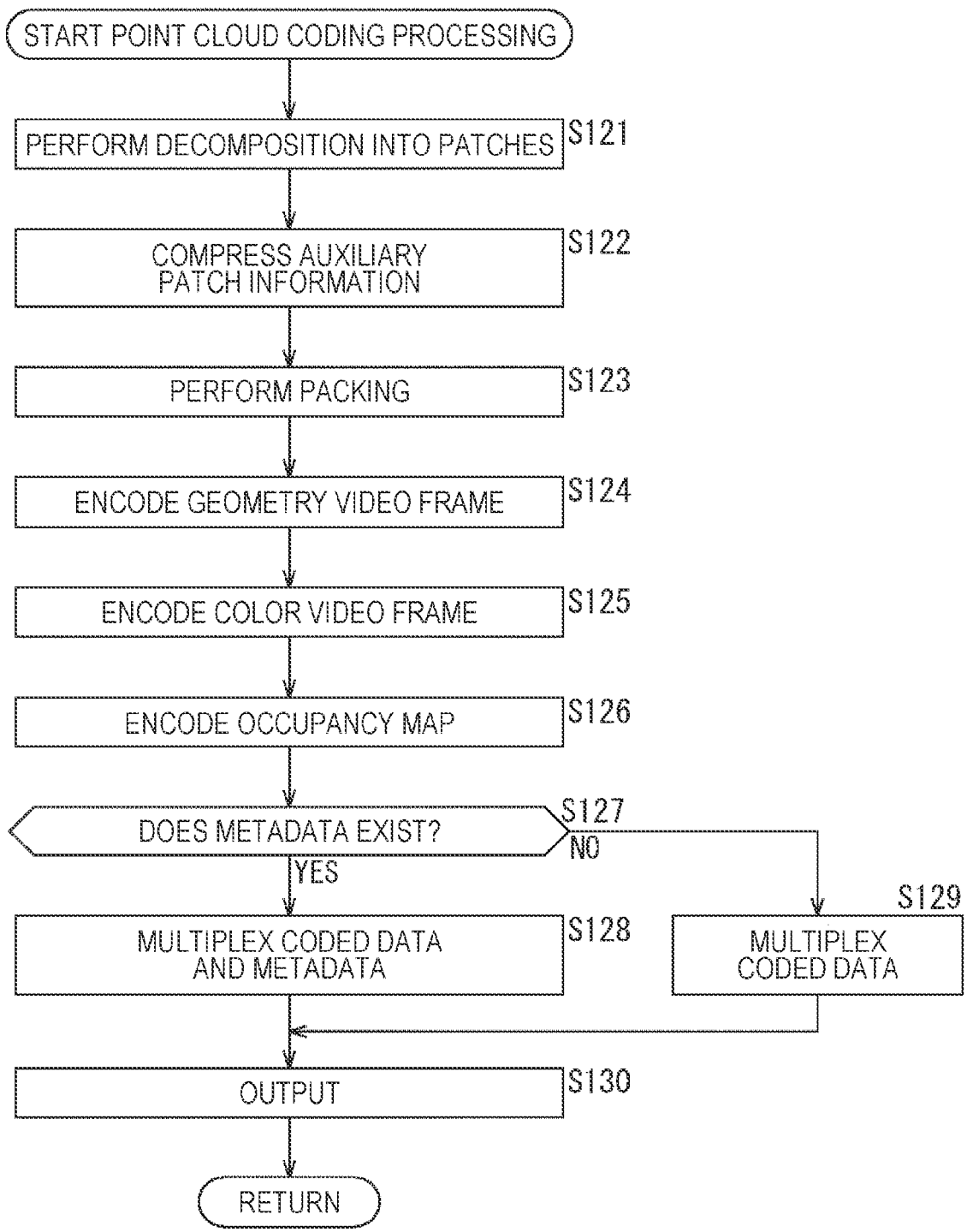
FIG. 15 is a flowchart illustrating an example of a flow of point cloud coding processing.

In step S128, the multiplexer 131 multiplexes the coded data generated in each of step S124 to step S126 and the metadata generated in step S104 of FIG. 14 to generate a bitstream that includes them. That is, the metadata generation unit 123 generates a bitstream that includes, as metadata, various types of information as described in <1. Signals of rendering camera parameters> with reference to Table 21 in FIG. 2 and the like. When the processing of step S128 ends, the processing proceeds to step S130.

Furthermore, in step S127, if the processing of step S104 in FIG. 14 has been skipped (omitted) and it is determined that no metadata exists, the processing proceeds to step S129.

In step S129, the multiplexer 131 multiplexes the coded data generated in each of step S124 to step S126 to generate a bitstream that includes them. When the processing of step S129 ends, the processing proceeds to step S130.

In step S130, the multiplexer 131 outputs the bitstream generated in step S128 or step S129 to the outside of the coding device 100.

When the processing of step S130 ends, the point cloud coding processing ends, and the processing returns to FIG. 14.

By executing each piece of processing as described above, the coding device 100 can generate a bitstream of 3D data that includes information regarding the camera for rendering 3D data as metadata. Consequently, the coding device 100 can obtain the effect as described above in <1. Signals of rendering camera parameters>. Consequently, the coding device 100 allows for easier and more appropriate rendering on the decoding side.

3. Second Embodiment

<Reproduction Device>

Figure 16:
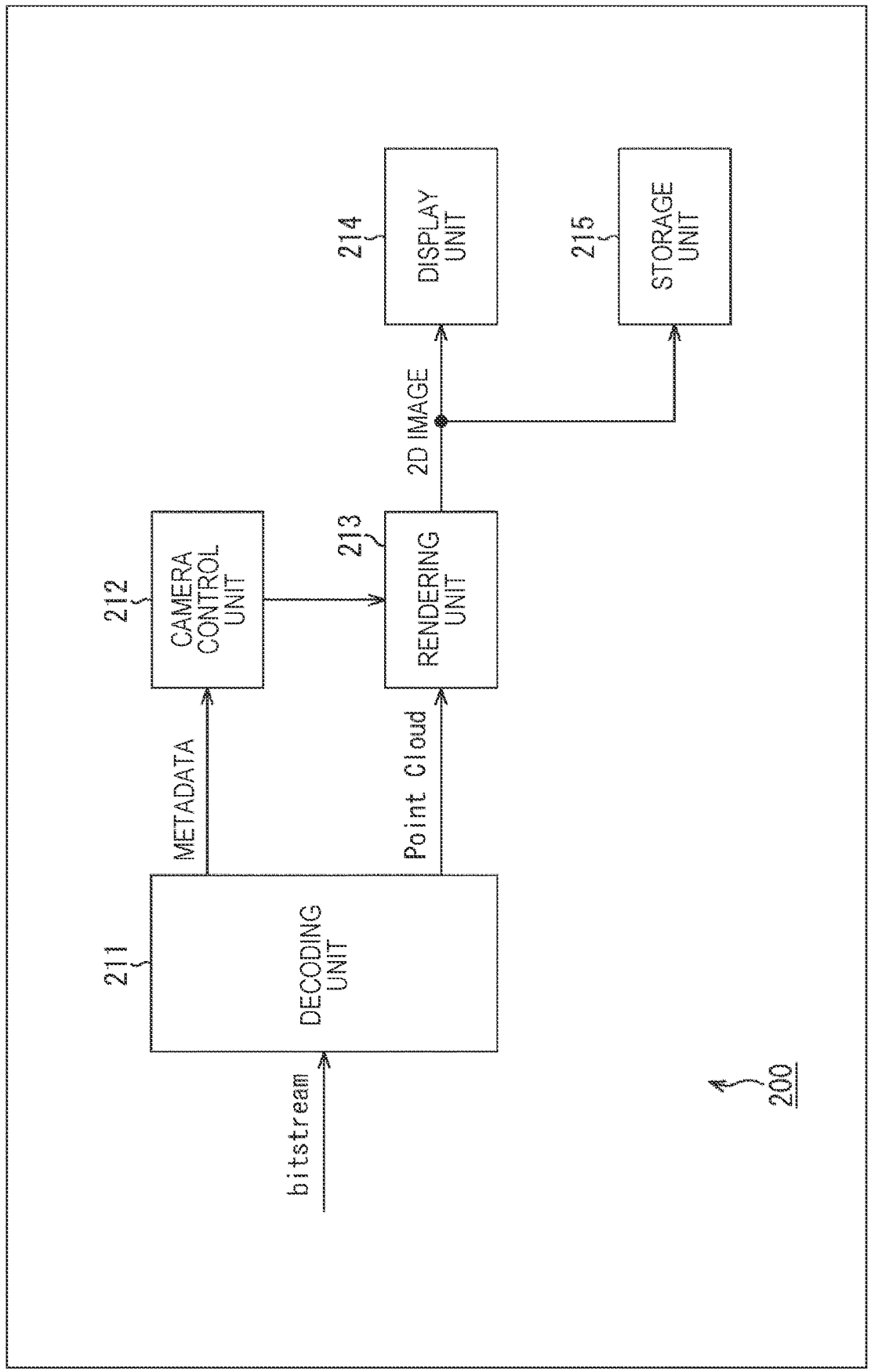
FIG. 16 is a block diagram illustrating an example of a main configuration of a reproduction device.

FIG. 16 is a block diagram illustrating an example of a configuration of a reproduction device, which is an aspect of an image processing apparatus to which the present technology is applied. A reproduction device 200 illustrated in FIG. 16 is a device (a reproduction device to which a video-based approach is applied) that decodes, by a decoding method for two-dimensional images, coded data obtained by projecting 3D data such as a point cloud onto a two-dimensional plane and encoding the 3D data, reconstructs the 3D data, and reproduces the 3D data. For example, the reproduction device 200 decodes a bitstream generated by encoding 3D data by the coding device 100 (FIG. 13), reconstructs the 3D data using the decoded data, renders the reconstructed 3D data to generate an image, and displays or stores the image.

Note that FIG. 16 illustrates a main part of processing units, a data flow, and the like, and not all of them are illustrated in FIG. 16. That is, the reproduction device 200 may include a processing unit that is not illustrated as a block in FIG. 16, or may involve a flow of processing or data that is not illustrated as an arrow or the like in FIG. 16. This also applies to other drawings for describing processing units and the like in the reproduction device 200.

As illustrated in FIG. 16, the reproduction device 200 includes a decoding unit 211, a camera control unit 212, a rendering unit 213, a display unit 214, and a storage unit 215.

The decoding unit 211 performs processing related to decoding of a bitstream. For example, the decoding unit 211 acquires a bitstream input from outside of the reproduction device 200. This bitstream is generated by, for example, the coding device 100 (FIG. 13), includes coded data of 3D data, and further includes, as metadata, information regarding a camera for rendering the 3D data. The decoding unit 211 is a decoding unit to which the video-based approach is applied. The decoding unit 211 decodes such a bitstream by the decoding method for two-dimensional images, reconstructs 3D data, and extracts metadata to be used to render the 3D data. The decoding unit 211 supplies the extracted metadata to the camera control unit 212. Furthermore, the decoding unit 211 supplies the reconstructed 3D data (e.g., a point cloud) to the rendering unit 213.

The camera control unit 212 performs processing related to controlling of the camera for rendering. For example, the camera control unit 212 controls the camera for rendering on the basis of information regarding the camera included in the metadata supplied from the decoding unit 211. For example, the camera control unit 212 controls the position, orientation, or the like of the camera by controlling camera parameters of the rendering camera on the basis of the information regarding the camera. The camera control unit 212 supplies the control information to the rendering unit 213.

The rendering unit 213 renders 3D data (point cloud) supplied from the decoding unit 211 by using the camera controlled by the camera control unit 212. That is, by using camera parameters set by the camera control unit 212 on the basis of metadata (various types of information as described in <1. Signals of rendering camera parameters> with reference to Table 21 in FIG. 2 and the like), the rendering unit 213 performs rendering to generate a 2D image. The rendering unit 213 supplies the generated 2D image to the display unit 214 and the storage unit 215.

The display unit 214 has an optional display device such as a liquid crystal display and performs processing related to display. For example, the display unit 214 acquires a 2D image supplied from the rendering unit 213. Then, the display unit 214 causes the display device to display the 2D image. That is, the display unit 214 outputs the 2D image.

The storage unit 215 has an optional storage medium such as a hard disk or a semiconductor memory, and performs processing related to storage. For example, the storage unit 215 acquires a 2D image supplied from the rendering unit 213. Then, the storage unit 215 stores the 2D image in the storage medium. That is, the storage unit 215 outputs the 2D image.

Consequently, the reproduction device 200 can obtain the effect as described above in <1. Signals of rendering camera parameters>. That is, the reproduction device 200 can more easily and more appropriately perform rendering.

<Decoding Unit>

Figure 17:
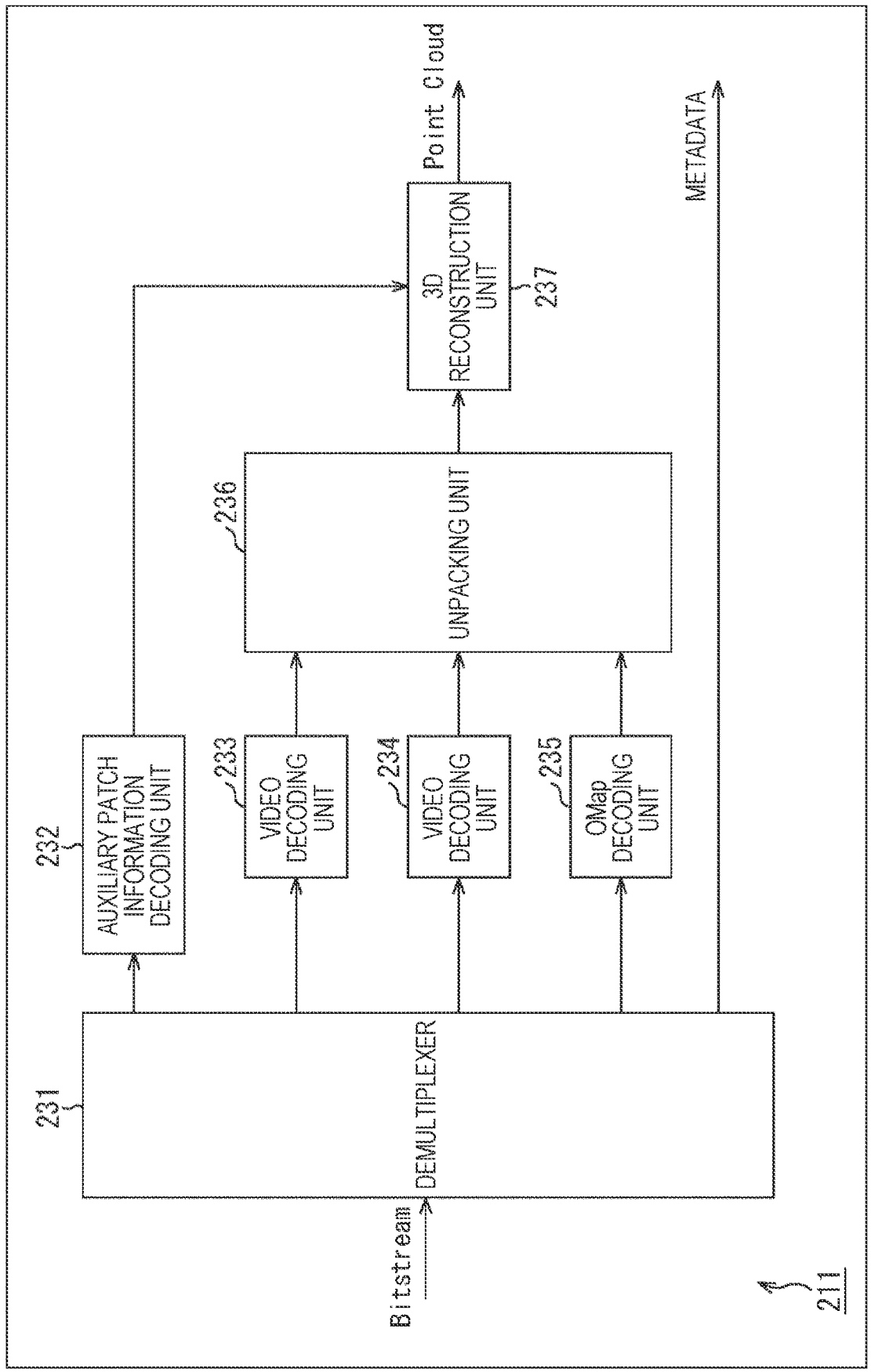
FIG. 17 is a block diagram illustrating an example of a main configuration of a decoding unit.

FIG. 17 is a block diagram illustrating an example of a main configuration of the decoding unit 211 in FIG. 16. As illustrated in FIG. 17, the decoding unit 211 includes a demultiplexer 231, an auxiliary patch information decoding unit 232, a video decoding unit 233, a video decoding unit 234, an OMap decoding unit 235, an unpacking unit 236, and a 3D reconstruction unit 237.

The demultiplexer 231 performs processing related to data demultiplexing. For example, the demultiplexer 231 acquires a bitstream input to the decoding unit 211. This bitstream is supplied from, for example, the coding device 100. The demultiplexer 231 demultiplexes this bitstream, extracts coded data of auxiliary patch information, and supplies it to the auxiliary patch information decoding unit 232. Furthermore, the demultiplexer 231 extracts coded data of a geometry video frame from a bitstream by demultiplexing, and supplies it to the video decoding unit 233. Moreover, the demultiplexer 231 extracts coded data of a color video frame from a bitstream by demultiplexing, and supplies it to the video decoding unit 234. Furthermore, the demultiplexer 231 extracts coded data of an occupancy map from a bitstream by demultiplexing, and supplies it to the OMap decoding unit 235. Moreover, the demultiplexer 231 extracts control information regarding packing from a bitstream by demultiplexing, and supplies it to the unpacking unit 236 (not illustrated).

Furthermore, the demultiplexer 231 extracts, from a bitstream, metadata included in the bitstream. This metadata includes various types of information (information regarding the camera for rendering 3D data) as described in <1. Signals of rendering camera parameters> with reference to Table 21 in FIG. 2 and the like. The demultiplexer 231 supplies the metadata to the camera control unit 212 (FIG. 16).

The auxiliary patch information decoding unit 232 performs processing related to decoding of coded data of auxiliary patch information. For example, the auxiliary patch information decoding unit 232 acquires coded data of auxiliary patch information supplied from the demultiplexer 231. Furthermore, the auxiliary patch information decoding unit 232 decodes (decompresses) the coded data of the auxiliary patch information included in the acquired data. The auxiliary patch information decoding unit 232 supplies the auxiliary patch information obtained by decoding to the 3D reconstruction unit 237.

The video decoding unit 233 performs processing related to decoding of coded data of a geometry video frame. For example, the video decoding unit 233 acquires coded data of a geometry video frame supplied from the demultiplexer 231. The video decoding unit 233 decodes the coded data of the geometry video frame by an optional decoding method for two-dimensional images such as AVC or HEVC. The video decoding unit 233 supplies the geometry video frame obtained by the decoding to the unpacking unit 236.

The video decoding unit 234 performs processing related to decoding of coded data of a color video frame. For example, the video decoding unit 234 acquires coded data of a color video frame supplied from the demultiplexer 231. The video decoding unit 234 decodes the coded data of the color video frame by an optional decoding method for two-dimensional images such as AVC or HEVC. The video decoding unit 234 supplies the color video frame obtained by the decoding to the unpacking unit 236.

The OMap decoding unit 235 performs processing related to decoding of coded data of an occupancy map. For example, the OMap decoding unit 235 acquires coded data of an occupancy map supplied from the demultiplexer 231. The OMap decoding unit 235 decodes the coded data of the occupancy map by an optional decoding method corresponding to the encoding method used for the coded data. The OMap decoding unit 235 supplies the occupancy map obtained by the decoding to the unpacking unit 236.

The unpacking unit 236 performs processing related to unpacking. For example, the unpacking unit 236 acquires a geometry video frame from the video decoding unit 233, a color video frame from the video decoding unit 234, and an occupancy map from the OMap decoding unit 235. Furthermore, the unpacking unit 236 unpacks the geometry video frame and the color video frame on the basis of the control information regarding packing. The unpacking unit 236 supplies, to the 3D reconstruction unit 237, position information (geometry) data (geometry patch or the like), attribute information (texture) data (texture patch or the like), an occupancy map, and the like obtained by unpacking.

The 3D reconstruction unit 237 performs processing related to reconstruction of a point cloud. For example, the 3D reconstruction unit 237 reconstruct a point cloud on the basis of auxiliary patch information supplied from the auxiliary patch information decoding unit 232, and position information (geometry) data (geometry patch or the like), attribute information (texture) data (texture patch or the like), an occupancy map, and the like supplied from the unpacking unit 236.

The 3D reconstruction unit 237 supplies the reconstructed point cloud to the rendering unit 213 (FIG. 16) outside the decoding unit 211.

With such a configuration, the decoding unit 211 can obtain the effect as described above in <1. Signals of rendering camera parameters>. That is, the decoding unit 211 can decode a bitstream and extract metadata transmitted from the encoding side. Moreover, the decoding unit 211 can decode coded data of 3D data and reconstruct the 3D data.

<Flow of Reproduction Processing>

Figure 19:
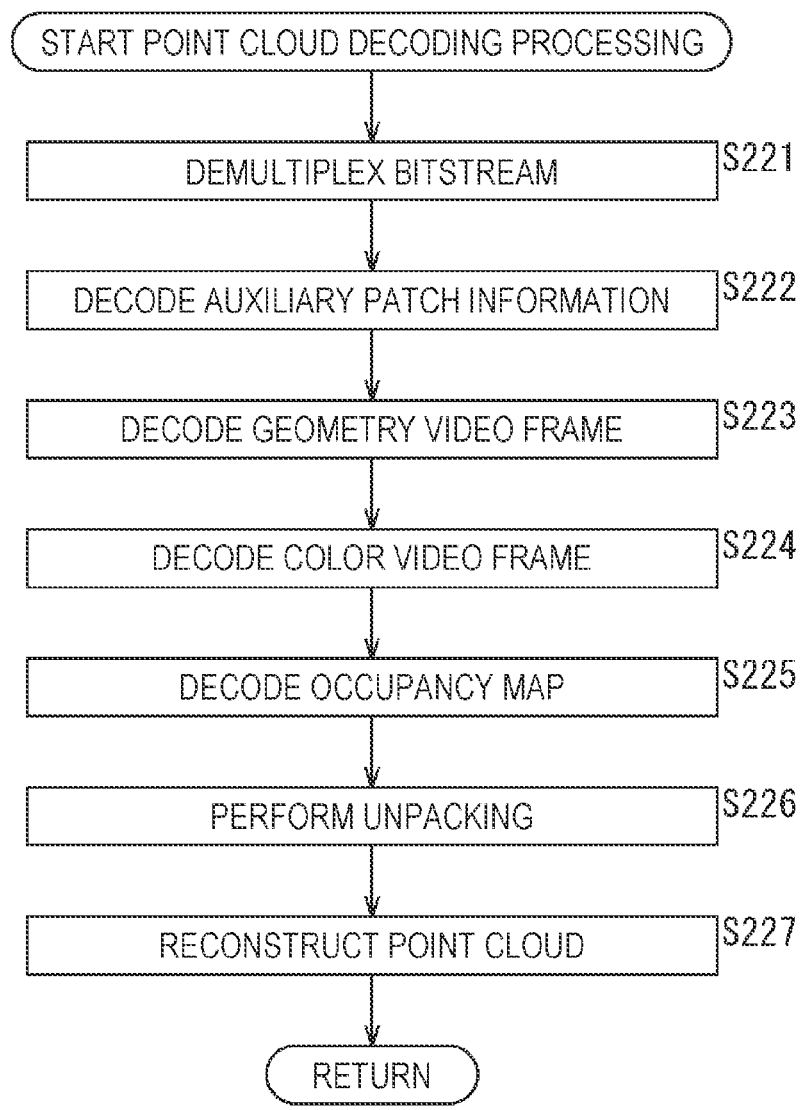
FIG. 19 is a flowchart illustrating an example of a flow of point cloud decoding processing.

Next, an example of a flow of reproduction processing executed by the reproduction device 200 will be described with reference to a flowchart in FIG. 19.

When the reproduction processing is started, the camera control unit 212 initializes camera parameters in step S201.

In step S202, the decoding unit 211 executes point cloud decoding processing to decode a bitstream for one frame.

In step S203, the camera control unit 212 determines whether or not metadata corresponding to the frame to be processed exists. That is, the camera control unit 212 determines whether or not metadata has been extracted by the processing of step S202. If it is determined that metadata exists, the processing proceeds to step S204.

In step S204, the camera control unit 212 analyzes the metadata and updates camera parameters. When the processing of step S204 ends, the processing proceeds to step S205. Furthermore, if it is determined in step S203 that no metadata exists, the processing of step S204 is skipped (omitted), and the processing proceeds to step S205.

In step S205, the rendering unit 213 renders a point cloud obtained by the processing of step S202, by using a camera parameter that has been updated in step S204 or a camera parameter that has not been updated in step S204, and generates a 2D image.

In step S206, the display unit 214 displays the 2D image generated in step S205. Furthermore, in step S207, the storage unit 215 stores the 2D image generated in step S205.

In step S208, the decoding unit 211 determines whether or not all the frames have been processed. If it is determined that there is an unprocessed frame, the processing returns to step S202, and the subsequent processing is repeated for the new frame to be processed. Furthermore, if it is determined in step S208 that all the frames have been processed, the reproduction processing ends.

<Flow of Point Cloud Decoding Processing>

Figure 18:
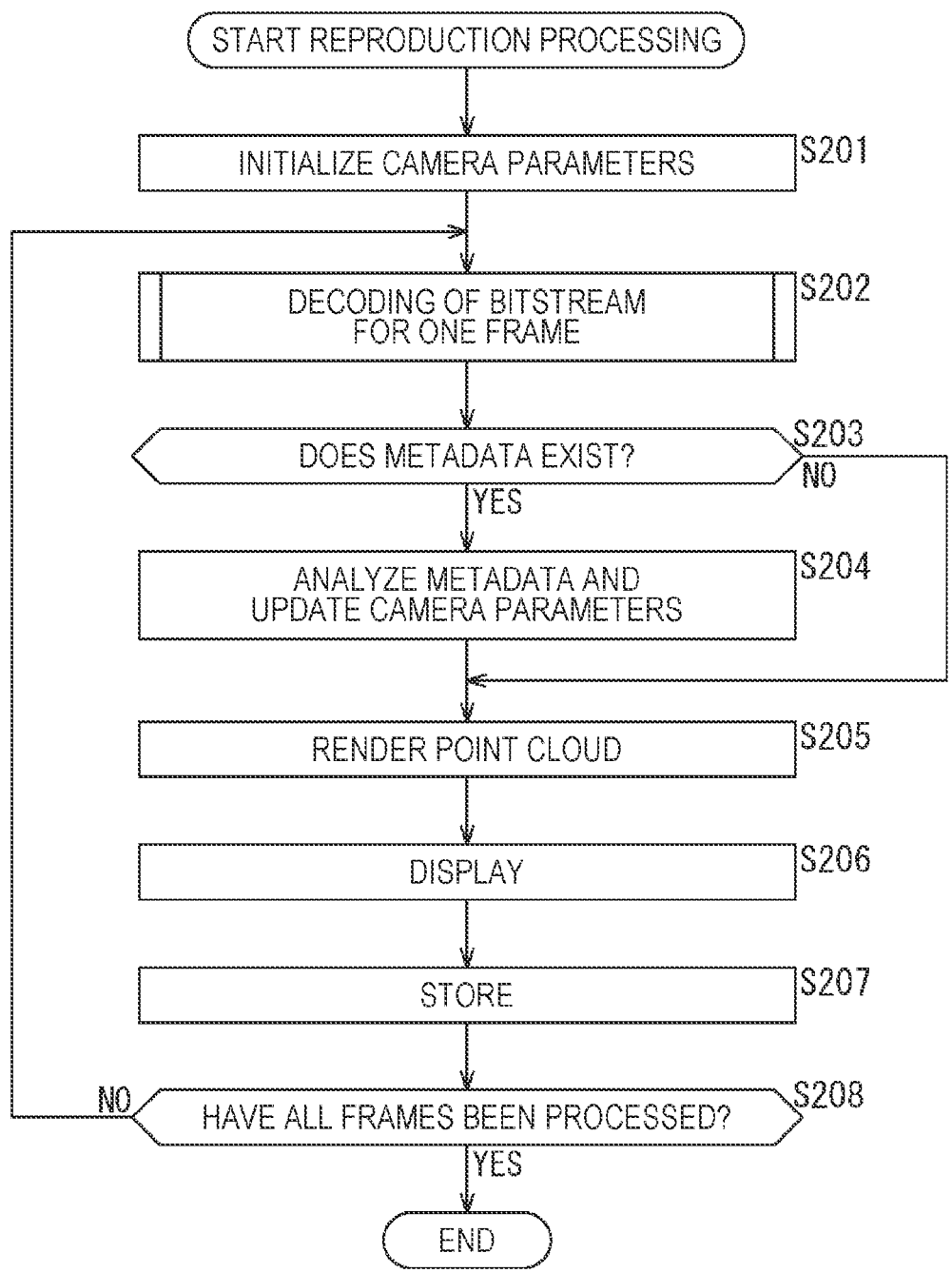
FIG. 18 is a flowchart illustrating an example of a flow of reproduction processing.

Next, an example of a flow of the point cloud decoding processing executed in step S202 of FIG. 18 will be described with reference to a flowchart in FIG. 19.

When the point cloud decoding processing is started, the demultiplexer 231 demultiplexes the bitstream in step S221. At that time, the demultiplexer 231 extracts metadata (information regarding the camera) included in the bitstream.

In step S222, the auxiliary patch information decoding unit 232 decodes auxiliary patch information extracted from the bitstream in step S221.

In step S223, the video decoding unit 233 decodes coded data of a geometry video frame (position information video frame) extracted from the bitstream in step S221.

In step S224, the video decoding unit 234 decodes coded data of a color video frame (attribute information video frame) extracted from the bitstream in step S221.

In step S225, the OMap decoding unit 235 decodes coded data of an occupancy map extracted from the bitstream in step S221.

In step S226, the unpacking unit 236 performs unpacking. For example, the unpacking unit 236 unpacks the geometry video frame obtained by decoding the coded data in step S223 to generate a geometry patch. Furthermore, the unpacking unit 236 unpacks the color video frame obtained by decoding the coded data in step S224 to generate a texture patch. Moreover, the unpacking unit 236 unpacks the occupancy map obtained by decoding the coded data in step S225, and extracts an occupancy map corresponding to the geometry patch and the texture patch.

In step S227, the 3D reconstruction unit 237 reconstructs the point cloud (each group-of-points model) on the basis of the auxiliary patch information obtained in step S222, the geometry patch, the texture patch, and the occupancy map obtained in step S223 to step S225, and the like.

When the processing of step S227 ends, the decoding processing ends.

By executing each piece of processing as described above, the reproduction device 200 can obtain the effect as described above in <1. Signals of rendering camera parameters>. That is, the reproduction device 200 can more easily and more appropriately perform rendering.

4. Third Embodiment

<Reproduction Device>

Figure 20:
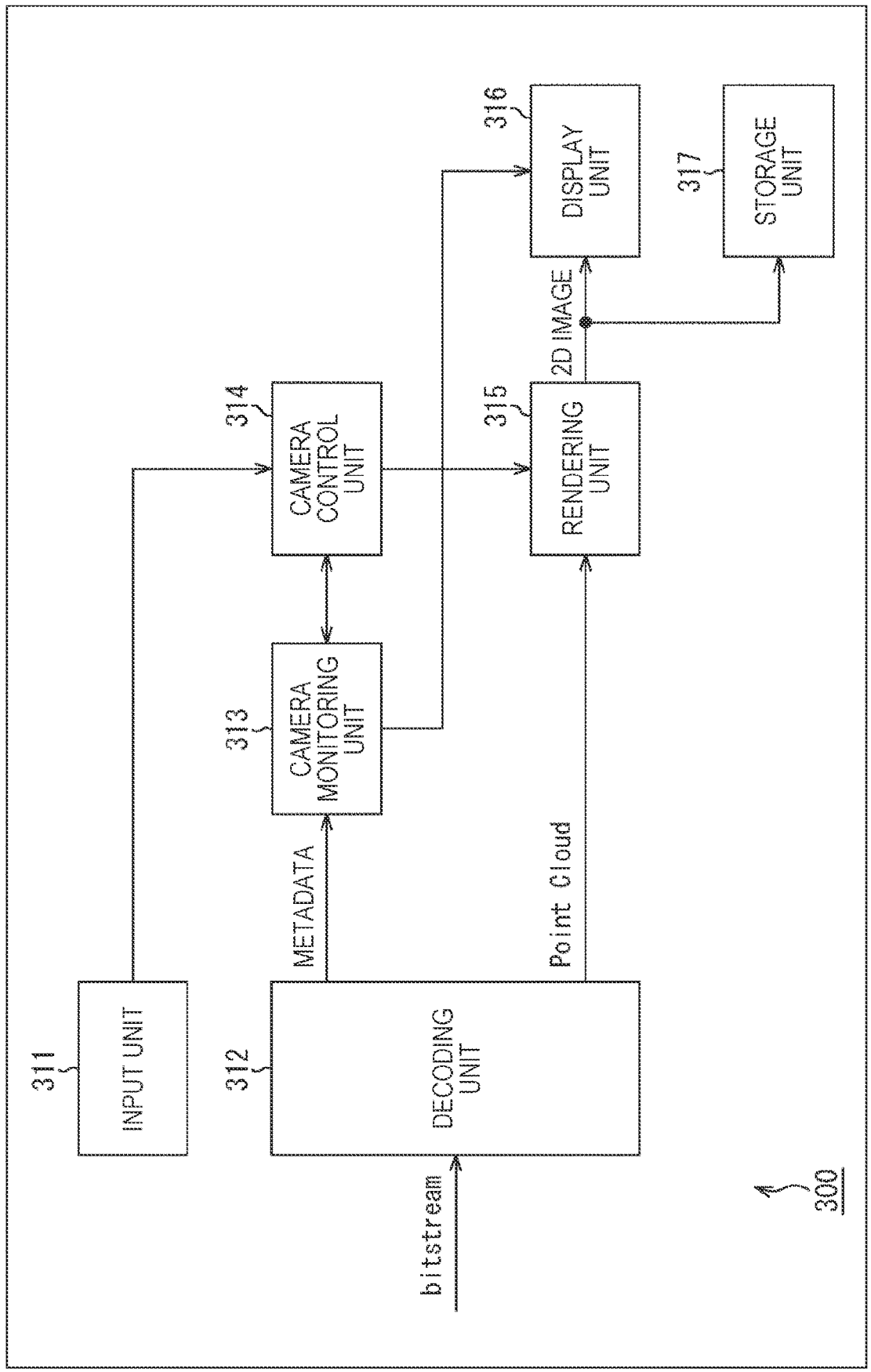
FIG. 20 is a block diagram illustrating an example of a main configuration of a reproduction device.

FIG. 20 is a block diagram illustrating an example of a configuration of a reproduction device, which is an aspect of an image processing apparatus to which the present technology is applied. In a similar manner to the reproduction device 200, a reproduction device 300 illustrated in FIG. 20 is a device (a reproduction device to which a video-based approach is applied) that decodes, by a decoding method for two-dimensional images, coded data obtained by projecting 3D data such as a point cloud onto a two-dimensional plane and encoding the 3D data, reconstructs the 3D data, and reproduces the 3D data. For example, the reproduction device 300 decodes a bitstream generated by encoding 3D data by the coding device 100 (FIG. 13), reconstructs the 3D data using the decoded data, renders the reconstructed 3D data to generate an image, and displays or stores the image.

Note that the reproduction device 300 receives camera parameter settings, and metadata (information regarding a camera) transmitted from the encoding side is used to determine whether or not the position, direction, and the like of the camera have been set appropriately.

Note that FIG. 20 illustrates a main part of processing units, a data flow, and the like, and not all of them are illustrated in FIG. 20. That is, the reproduction device 300 may include a processing unit that is not illustrated as a block in FIG. 20, or may involve a flow of processing or data that is not illustrated as an arrow or the like in FIG. 20. This also applies to other drawings for describing processing units and the like in the reproduction device 300.

As illustrated in FIG. 20, the reproduction device 300 includes an input unit 311, a decoding unit 312, a camera monitoring unit 313, a camera control unit 314, a rendering unit 315, a display unit 316, and a storage unit 317.

The input unit 311 has an optional input device, and performs processing related to receiving of an input from outside of the reproduction device 300. For example, the input unit 311 accepts an operation of inputting camera parameters related to a camera for rendering 3D data by a user (stream user or the like). For example, the input unit 311 receives various types of information as described in <1. Signals of rendering camera parameters> with reference to Table 21 in FIG. 2 and the like. The input unit 311 supplies the received camera parameters to the camera control unit 314.

The decoding unit 312 is a processing unit similar to the decoding unit 211, and performs processing related to decoding of a bitstream. For example, the decoding unit 312 acquires a bitstream input from outside of the reproduction device 200. This bitstream is generated by, for example, the coding device 100 (FIG. 13), includes coded data of 3D data, and further includes, as metadata, information regarding a camera for rendering the 3D data. In a similar manner to the decoding unit 211, the decoding unit 312 is a decoding unit to which the video-based approach is applied. The decoding unit 312 decodes such a bitstream by the decoding method for two-dimensional images, reconstructs 3D data, and extracts metadata. The decoding unit 312 supplies the extracted metadata to the camera monitoring unit 313. Furthermore, the decoding unit 312 supplies the reconstructed 3D data (e.g., a point cloud) to the rendering unit 315. Note that the decoding unit 312 has a configuration similar to the case of the decoding unit 211 (FIG. 17), and the description thereof will be omitted.

The camera monitoring unit 313 monitors the position and orientation of the camera. For example, the camera monitoring unit 313 monitors whether or not a camera parameter value set via the input unit 311 by a user or the like is appropriate on the basis of the metadata supplied from the decoding unit 312. For example, the camera monitoring unit 313 monitors whether or not a camera parameter value set by a user or the like is within a range for which a quality check has been performed. Then, if it is determined that the camera parameter value is inappropriate, the camera monitoring unit 313 controls the display unit 316 to provide an error notification.

The camera control unit 314 performs processing related to controlling of the camera for rendering. For example, the camera control unit 314 controls the camera for rendering on the basis of camera parameters (information regarding the camera) supplied from the input unit 311. For example, the camera control unit 314 controls the position, orientation, or the like of the camera by controlling camera parameters of the rendering camera on the basis of the information regarding the camera. Note that if the camera monitoring unit 313 determines that the values are appropriate, the camera control unit 314 supplies the control information to the rendering unit 315.

In a similar manner to the rendering unit 213, the rendering unit 315 renders 3D data (point cloud) supplied from the decoding unit 312 by using the camera controlled by the camera control unit 314. That is, by using camera parameters supplied from the camera control unit 314 (various types of information as described in <1. Signals of rendering camera parameters> with reference to Table 21 in FIG. 2 and the like), the rendering unit 315 performs rendering to generate a 2D image. The rendering unit 315 supplies the generated 2D image to the display unit 316 and the storage unit 317.

In a similar manner to the display unit 214, the display unit 316 has an optional display device such as a liquid crystal display and performs processing related to display. For example, the display unit 316 acquires a 2D image supplied from the rendering unit 315. Then, the display unit 316 causes the display device to display the 2D image. That is, the display unit 316 outputs the 2D image. Furthermore, the display unit 316 is controlled by the camera monitoring unit 313 to display an image of an error notification.

The storage unit 317 has an optional storage medium such as a hard disk or a semiconductor memory, and performs processing related to storage. For example, the storage unit 317 acquires a 2D image supplied from the rendering unit 315. Then, the storage unit 317 stores the 2D image in the storage medium. That is, the storage unit 317 outputs the 2D image.

Consequently, the reproduction device 300 can obtain the effect as described above in <1. Signals of rendering camera parameters>. That is, the reproduction device 300 can more easily and more appropriately perform rendering.

<Flow of Reproduction Processing>

Figure 21:
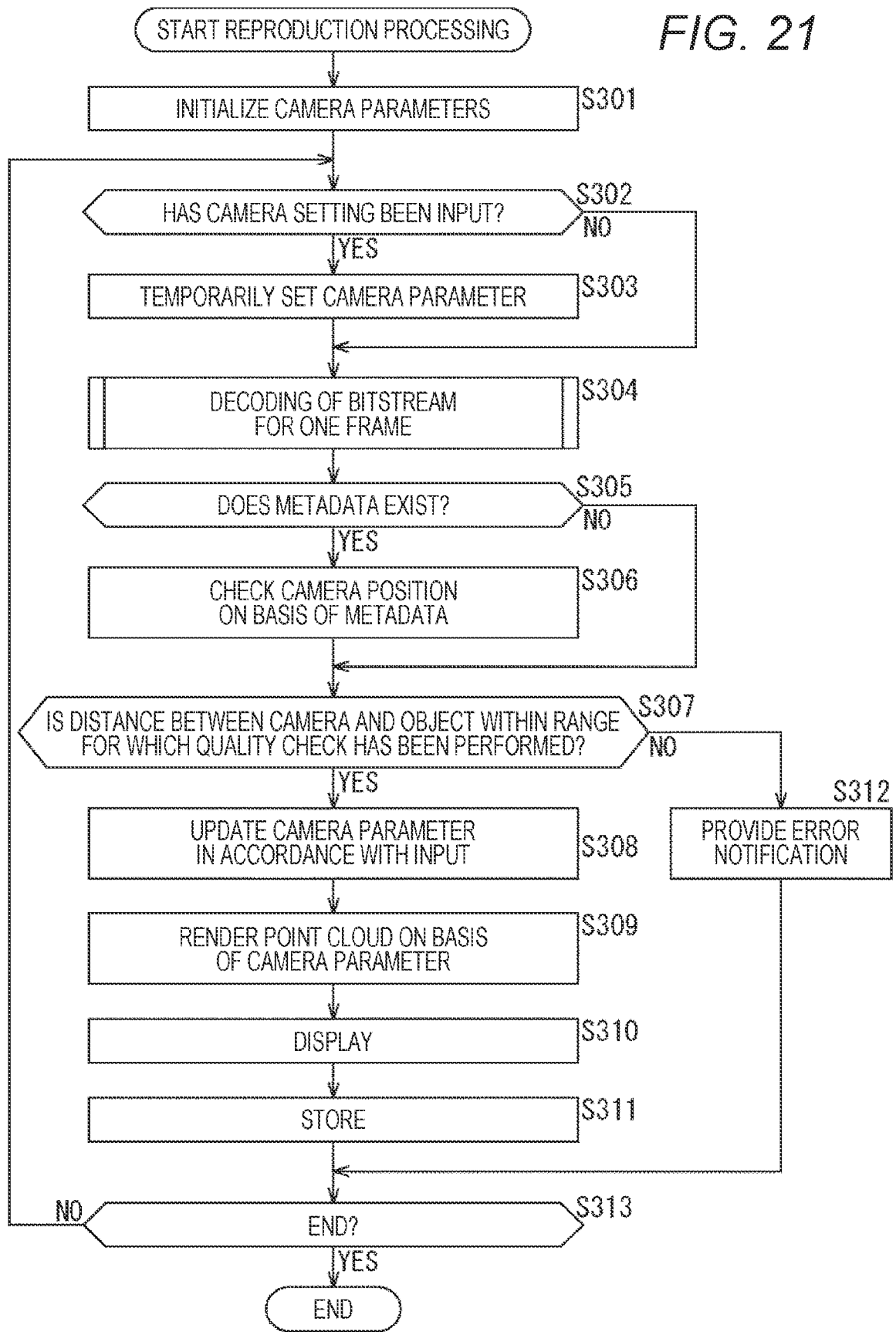
FIG. 21 is a flowchart illustrating an example of a flow of reproduction processing.

Next, an example of a flow of reproduction processing executed by the reproduction device 300 will be described with reference to a flowchart in FIG. 21.

When the reproduction processing is started, the camera control unit 314 initializes camera parameters in step S301.

In step S302, the input unit 311 determines whether or not a camera setting has been input. If it is determined that a camera setting has been input, the processing proceeds to step S303. In step S303, the camera control unit 314 temporarily sets a camera parameter on the basis of the input camera setting. Then, when the processing of step S303 ends, the processing proceeds to step S304. Note that if it is determined in step S302 that no camera setting has been input, the processing of step S303 is skipped (omitted), and the processing proceeds to step S304.

In step S304, the decoding unit 312 executes point cloud decoding processing to decode a bitstream for one frame. Note that the flow of the point cloud decoding processing in this case is similar to that described with reference to the flowchart in FIG. 19, and the description thereof will be omitted.

In step S305, the camera monitoring unit 313 determines whether or not metadata corresponding to the frame to be processed exists. That is, the camera monitoring unit 313 determines whether or not metadata has been extracted by the processing of step S304. If it is determined that metadata exists, the processing proceeds to step S306.

In step S306, the camera monitoring unit 313 checks a camera position on the basis of the metadata that has been confirmed to exist. When the processing of step S306 ends, the processing proceeds to step S307. Furthermore, if it is determined in step S305 that no metadata exists, the processing of step S306 is skipped (omitted), and the processing proceeds to step S307.

In step S307, the camera monitoring unit 313 determines whether or not a current distance between the camera and an object is within a range for which a quality check has been performed. If it is determined that the distance is within the range for which a quality check has been performed, the processing proceeds to step S308.

In step S308, the camera control unit 314 updates the camera parameter in accordance with the input received by the input unit 311. In step S309, the rendering unit 315 renders a point cloud on the basis of the camera parameter updated in step S308, and generates a 2D image.

In step S310, the display unit 316 displays the 2D image generated in step S309. Furthermore, in step S311, the storage unit 317 stores the 2D image generated in step S309.

When the processing of step S311 ends, the processing proceeds to step S313. Furthermore, if it is determined in step S307 that the distance between the camera and the object is out of the range for which a quality check has been performed, the processing proceeds to step S312. In this case, the rendering is omitted because there is a possibility that a subjective image quality of the 2D image may be reduced after the rendering. Then, in step S312, the camera monitoring unit 313 causes the display unit 316 to display an image of an error notification notifying a user to that effect. When the processing of step S312 ends, the processing proceeds to step S313.

In step S313, the camera monitoring unit 313 determines whether or not to end the reproduction processing. If it is determined that the processing is not to be ended, the processing returns to step S302, and the subsequent processing is repeated for a new frame to be processed. Furthermore, if it is determined in step S313 that all the frames have been processed and there is no unprocessed frame, and the processing is to be ended, the reproduction processing ends.

By executing each piece of processing as described above, the reproduction device 300 can obtain the effect as described above in <1. Signals of rendering camera parameters>. That is, the reproduction device 300 can more easily and more appropriately perform rendering.

5. Note

<Computer>

The series of pieces of processing described above can be executed not only by hardware but also by software. In a case where the series of pieces of processing is executed by software, a program constituting the software is installed on a computer. Here, the computer includes a computer incorporated in dedicated hardware, or a general-purpose personal computer capable of executing various functions with various programs installed therein, for example.

FIG. 22 is a block diagram illustrating a configuration example of hardware of a computer that executes the series of pieces of processing described above in accordance with a program.

In a computer 900 illustrated in FIG. 22, a central processing unit (CPU) 901, a read only memory (ROM) 902, and a random access memory (RAM) 903 are connected to each other via a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, or the like. The output unit 912 includes, for example, a display, a speaker, an output terminal, or the like. The storage unit 913 includes, for example, a hard disk, a RAM disk, a nonvolatile memory, or the like. The communication unit 914 includes, for example, a network interface. The drive 915 drives a removable medium 921 such as a magnetic disk, an optical disk, a magneto-optical disk, or a semiconductor memory.

To perform the series of pieces of processing described above, the computer configured as described above causes the CPU 901 to, for example, load a program stored in the storage unit 913 into the RAM 903 via the input/output interface 910 and the bus 904 and then execute the program. The RAM 903 also stores, as appropriate, data or the like necessary for the CPU 901 to execute various types of processing.

The program to be executed by the computer (CPU 901) can be provided by, for example, being recorded on the removable medium 921 as a package medium or the like. In that case, inserting the removable medium 921 into the drive 915 allows the program to be installed into the storage unit 913 via the input/output interface 910.

Furthermore, the program can also be provided via a wired or wireless transmission medium such as a local area network, the Internet, or digital satellite broadcasting. In that case, the program can be received by the communication unit 914 and installed into the storage unit 913.

In addition, the program can also be installed in advance in the ROM 902 or the storage unit 913.

<Applicable Targets of Present Technology>

The above description shows a case where the present technology is applied to encoding/decoding of point cloud data, but the present technology is not limited to these examples, and can be applied to encoding/decoding of 3D data of any standard. That is, the various types of processing such as encoding/decoding methods and the various types of data such as 3D data and metadata may have any specifications, as long as the specifications do not contradict the present technology described above. Furthermore, some of the pieces of processing and specifications described above may be omitted as long as the omission does not contradict the present technology.

The present technology can be applied to any configuration. For example, the present technology can be applied to a variety of electronic devices such as a transmitter or a receiver (e.g., a television receiver or a mobile phone) for satellite broadcasting, wired broadcasting such as cable TV, distribution on the Internet, distribution to a terminal by cellular communication, or the like, or a device (e.g., a hard disk recorder or a camera) that records an image on a medium such as an optical disk, a magnetic disk, or a flash memory, and reproduces an image from such a storage medium.

Furthermore, for example, the present technology can also be carried out as a configuration of a part of a device such as a processor (e.g., a video processor) as a system large scale integration (LSI) or the like, a module (e.g., a video module) using a plurality of processors or the like, a unit (e.g., a video unit) using a plurality of modules or the like, or a set (e.g., a video set) in which other functions have been added to a unit.

Furthermore, for example, the present technology can also be applied to a network system constituted by a plurality of devices. For example, the present technology may be carried out as cloud computing in which a plurality of devices shares and jointly performs processing via a network. For example, the present technology may be carried out in a cloud service that provides services related to images (moving images) to an optional terminal such as a computer, an audio visual (AV) device, a portable information processing terminal, or an Internet of Things (IoT) device.

Note that, in the present specification, a system means a set of a plurality of components (devices, modules (parts), and the like), and it does not matter whether or not all components are in the same housing. Thus, a plurality of devices housed in separate housings and connected via a network, and one device having a plurality of modules housed in one housing are both systems.

<Fields and Uses to which Present Technology can be Applied>

Systems, devices, processing units, and the like to which the present technology is applied can be used in any field such as transportation, medical care, crime prevention, agriculture, livestock industry, mining, beauty, factories, home appliances, weather, or nature monitoring. Furthermore, they can be used for any intended use.

<Others>

Note that, in the present specification, a "flag" is information for identifying a plurality of situations, and includes not only information used for identifying two situations, true (1) and false (0), but also information that enables identification of three or more situations. Consequently, the number of values that this "flag" can take may be two such as "1" and "0", or may be three or more. That is to say, the number of bits constituting this "flag" is optional, and may be one bit or may be a plurality of bits. Furthermore, assumption of identification information (including a flag) includes not only a case where the identification information is included in a bitstream but also a case where difference information between the identification information and a certain piece of information serving as a reference is included in a bitstream. Thus, in the present specification, a "flag" and "identification information" include not only the information but also difference information between the information and a piece of information serving as a reference.

Furthermore, the various types of information (metadata or the like) regarding coded data (bitstream) may be transmitted or recorded in any form as long as it is associated with the coded data. Here, the term "associated with" means, for example, allowing one piece of data to be used (linked) when another piece of data is processed. That is, pieces of data associated with each other may be combined as one piece of data, or may be treated as separate pieces of data. For example, information associated with coded data (image) may be transmitted via a transmission path different from that of the coded data (image). Furthermore, for example, information associated with coded data (image) may be recorded on a recording medium different from that where the coded data (image) is recorded (or in a different recording area in the same recording medium). Note that this "associated with" may indicate association with not the entire data but a part of the data. For example, an image and information corresponding to the image may be associated with each other by any unit such as a plurality of frames, one frame, or a part of a frame.

Note that, in the present specification, terms such as "synthesize", "multiplex", "add", "integrate", "include", "store" "put into", "merge", and "insert" mean combining a plurality of objects into one, for example, combining coded data and metadata into one piece of data, and means one method of "associated with" described above.

Furthermore, embodiments of the present technology are not limited to the embodiments described above but can be modified in various ways within a scope of the present technology.

For example, a configuration described as one device (or processing unit) may be divided and configured as a plurality of devices (or processing units). Conversely, configurations described above as a plurality of devices (or processing units) may be combined and configured as one device (or processing unit). Furthermore, as a matter of course, a configuration other than those described above may be added to the configurations of the devices (or the processing units). Moreover, as long as the configuration and operation of the entire system remain substantially the same, a part of the configuration of a certain device (or processing unit) may be included in the configuration of another device (or another processing unit).

Furthermore, for example, the program described above may be executed by any device. In that case, the device is only required to have necessary functions (functional blocks and the like) and be able to obtain necessary information.

Furthermore, for example, the steps of one flowchart may be executed by one device, or may be shared and executed by a plurality of devices. Moreover, in a case where a plurality of pieces of processing is included in one step, the plurality of pieces of processing may be executed by one device, or may be shared and executed by a plurality of devices. In other words, a plurality of pieces of processing included in one step may be processed as a plurality of steps. Conversely, processing described as a plurality of steps may be collectively executed as one step.

Furthermore, for example, the program to be executed by the computer may be configured so that the steps described are processed in chronological order as described in the present specification, or the steps are processed in parallel or processed individually when needed, for example, when a call is made. That is, as long as no contradiction arises, the steps may be processed in an order different from the order described above. Moreover, the program may be configured so that processing of the steps described is executed in parallel with processing of another program, or executed in combination with processing of another program.

Furthermore, for example, a plurality of technologies related to the present technology can each be carried out independently and individually as long as no contradiction arises. As a matter of course, any two or more technologies related to the present technology may be used together and carried out. For example, some or all of the technologies related to the present technology described in any one of the embodiments may be carried out in combination with some or all of the technologies related to the present technology described in another embodiment. Furthermore, some or all of any of the technologies related to the present technology described above may be carried out in combination with another technology that is not described above.

REFERENCE SIGNS LIST

100 Coding device
111 Patch decomposition unit
112 Packing unit
113 Auxiliary patch information compression unit
114 Video coding unit
115 Video coding unit
116 OMap coding unit
121 Input unit
122 Parameter storage unit
123 Metadata generation unit
131 Multiplexer
200 Reproduction device
211 Decoding unit
212 Camera control unit
213 Rendering unit
214 Display unit
215 Storage unit
231 Demultiplexer
232 Auxiliary patch information decoding unit
233 Video decoding unit
234 Video decoding unit
235 OMap decoding unit
236 Unpacking unit
237 3D reconstruction unit
300 Reproduction device
311 Input unit
312 Decoding unit
313 Camera monitoring unit
314 Camera control unit
315 Rendering unit
316 Display unit
317 Storage unit

The invention claimed is:

1. An image processing apparatus, comprising:
circuitry configured to:
encode a two-dimensional plane image in which position information and attribute information for a point cloud that represents an object having a three-dimensional shape as a group of points are projected onto a two-dimensional plane;
generate coded data based on the encoded two-dimensional plane image; and
generate a bitstream that includes the coded data and metadata to be used to render the point cloud, wherein the metadata includes a conversion rate between a real scale and a scale in an image obtained based on a rendering operation the point cloud.

2. The image processing apparatus according to claim 1, wherein the metadata further includes an index that identifies a camera parameter with a specific condition for a camera to render the point cloud.

3. The image processing apparatus according to claim 2, wherein the camera parameter includes a parameter that indicates a position of the camera.

4. The image processing apparatus according to claim 2, wherein the camera parameter includes a parameter that indicates a direction of the camera.

5. The image processing apparatus according to claim 2, wherein the camera parameter includes a parameter that indicates an upward direction of the camera.

6. The image processing apparatus according to claim 2, wherein the camera parameter includes a parameter that indicates a projection method of the camera.

7. The image processing apparatus according to claim 2, wherein the camera parameter includes a parameter that indicates an angle of view of the camera.

8. The image processing apparatus according to claim 1, wherein the metadata further includes an index that identifies a purpose of a camera for rendering.

9. The image processing apparatus according to claim 8, wherein the purpose includes a quality check at a time of encoding.

10. The image processing apparatus according to claim 8, wherein the purpose includes a recommended orientation of the camera.

11. The image processing apparatus according to claim 8, wherein the purpose includes a recommended movement trajectory of the camera.

12. The image processing apparatus according to claim 1, wherein the metadata further includes a camera parameter set with use of a bounding box as a reference.

13. The image processing apparatus according to claim 1, wherein the metadata further includes a camera movement trajectory parameter that indicates a movement trajectory of a camera for rendering.

14. The image processing apparatus according to claim 1, wherein the metadata further includes an object movement trajectory parameter that indicates a movement trajectory of the object.

15. An image processing method, comprising:
encoding a two-dimensional plane image in which position information and attribute information for a point cloud that represents an object having a three-dimensional shape as a group of points are projected onto a two-dimensional plane;
generating coded data based on the encoded two-dimensional plane image; and
generating a bitstream that includes the generated coded data and metadata to be used to render the point cloud, wherein the metadata includes a conversion rate between a real scale and a scale in an image obtained by rendering the point cloud.

16. An image processing apparatus, comprising:
circuitry configured to:
decode a bitstream that includes coded data and metadata to be used to render a point cloud, wherein the coded data is obtained by encode of a two-dimensional plane image in which position information and attribute information for a point cloud that represents an object having a three-dimensional shape as a group of points are projected onto a two-dimensional plane;
reconstruct the point cloud;
extract the metadata;
control a camera parameter based on an external input;
monitor, based on the extracted metadata, the camera parameter is within a range for which a quality check has been performed; and
render the reconstructed point cloud based on the camera parameter is within the range for which the quality check has been performed.

17. An image processing method, comprising:
decoding a bitstream that includes coded data and metadata to be used to render a point cloud, wherein the coded data is obtained by encoding a two-dimensional plane image in which position information and attribute information for a point cloud that represents an object having a three-dimensional shape as a group of points are projected onto a two-dimensional plane;
reconstructing the point cloud;
extracting the metadata;
controlling a camera parameter based on an external input;
monitoring, based on the extracted metadata, the camera parameter is within a range for which a quality check has been performed; and
rendering the reconstructed point cloud based on the camera parameter is within the range for which the quality check has been performed.

* * * * *